United States Patent
Ushakov

(10) Patent No.: US 10,082,681 B2
(45) Date of Patent: *Sep. 25, 2018

(54) COMPOSITE WEARABLE ELECTRONIC COMMUNICATION DEVICE

(71) Applicant: Alexey Leonidovich Ushakov, Moscow (RU)

(72) Inventor: Alexey Leonidovich Ushakov, Moscow (RU)

( * ) Notice: Subject to any disclaimer, the term of this patent is extended or adjusted under 35 U.S.C. 154(b) by 0 days.

This patent is subject to a terminal disclaimer.

(21) Appl. No.: 15/449,613

(22) Filed: Mar. 3, 2017

(65) Prior Publication Data

US 2017/0176778 A1   Jun. 22, 2017

Related U.S. Application Data

(63) Continuation of application No. 14/541,873, filed on Nov. 14, 2014, now Pat. No. 9,612,440.

(30) Foreign Application Priority Data

Apr. 9, 2014   (RU) ................................ 2014113968

(51) Int. Cl.
| | | |
|---|---|---|
| *G02C 11/00* | (2006.01) | |
| *G02C 3/00* | (2006.01) | |
| *G06F 1/16* | (2006.01) | |
| *H04M 1/05* | (2006.01) | |
| *G02C 5/02* | (2006.01) | |
| *G02C 5/12* | (2006.01) | |

(Continued)

(52) U.S. Cl.
CPC .............. *G02C 11/10* (2013.01); *G02C 3/003* (2013.01); *G02C 3/006* (2013.01); *G06F 1/163* (2013.01); *H04M 1/05* (2013.01); *G02C 5/02* (2013.01); *G02C 5/12* (2013.01); *G02C 5/14* (2013.01); *H04N 5/2252* (2013.01)

(58) Field of Classification Search
CPC ........ G02C 11/10; G02C 3/003; G02C 3/006; G02C 5/14; G02C 5/12; G02C 5/02; G06F 1/163; H04M 1/05; H04N 5/2252
See application file for complete search history.

(56) References Cited

U.S. PATENT DOCUMENTS

| | | | | |
|---|---|---|---|---|
| 5,903,928 A | * | 5/1999 | Hyung-Seob .......... | A41D 27/00 2/115 |
| 2005/0248721 A1 | * | 11/2005 | Sieger .................... | G02C 11/02 351/157 |

(Continued)

*Primary Examiner* — Mekonnen Dagnew
(74) *Attorney, Agent, or Firm* — Bardmesser Law Group

(57) ABSTRACT

A wearable electronic communication device includes a neck loop with a first electrical connector; a frame comprising a second electrical connector, a front bar with nose pads, and two temples, wherein each temple is connected to one of two lateral ends of the front bar; a first wire connected to one of the lateral temples; and a second wire connected to the other lateral temple. The first or second wire is electrically connected to the second electrical connector, and the other end of the same wire is electrically connected to the first electrical connector. The first and second wires are connected to the neck loop close to each other and form a dorsal wire node on the neck. The first and second wires are mechanically connected to each other between the frame and the dorsal wire node to form a suboccipital wire node below an occiput of the user.

21 Claims, 21 Drawing Sheets

(51) Int. Cl.
G02C 5/14 (2006.01)
H04N 5/225 (2006.01)

(56) References Cited

U.S. PATENT DOCUMENTS

2008/0144854 A1* 6/2008 Abreu .................... G02C 3/003
                                                    381/74
2011/0216931 A1* 9/2011 Bui ....................... H04R 1/1091
                                                    381/333

* cited by examiner

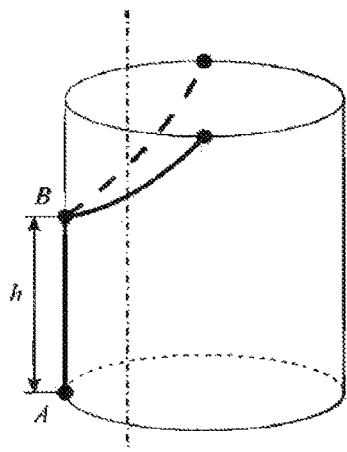
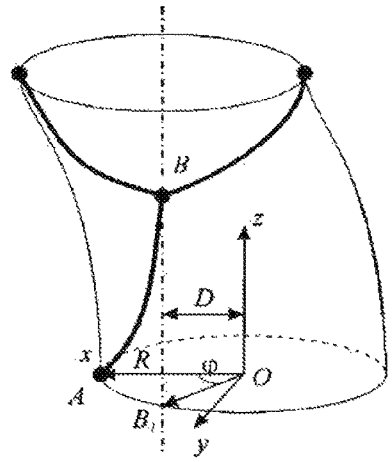
FIG. 2a    FIG. 2b
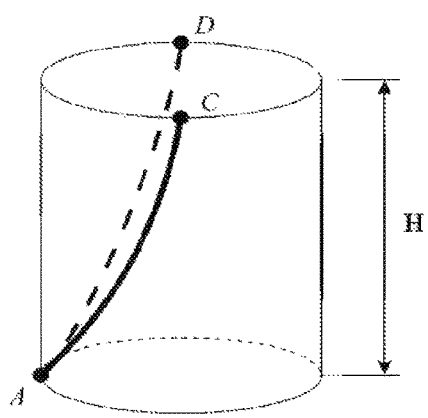
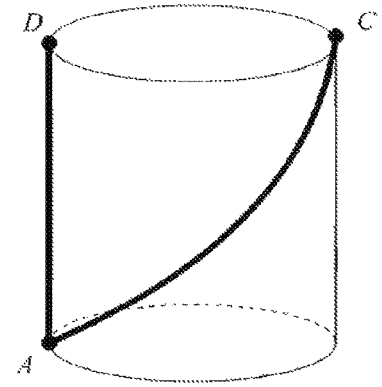
FIG. 3a    FIG. 3b

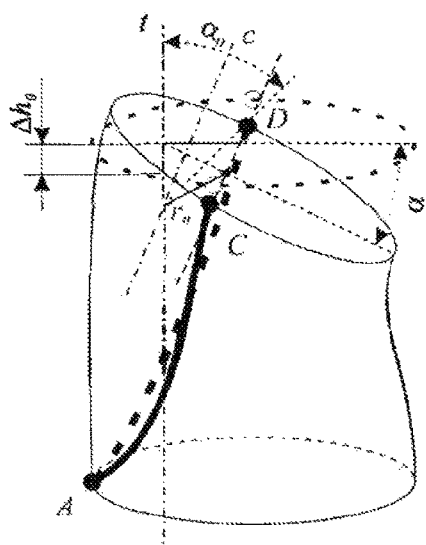
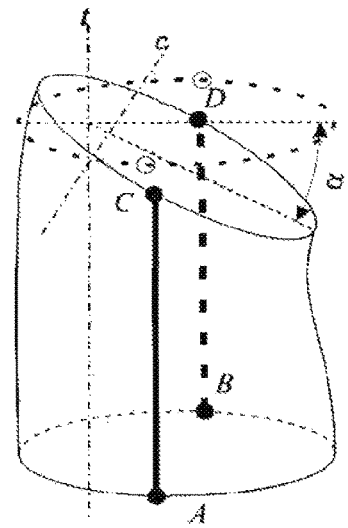
FIG. 6a  FIG. 6b
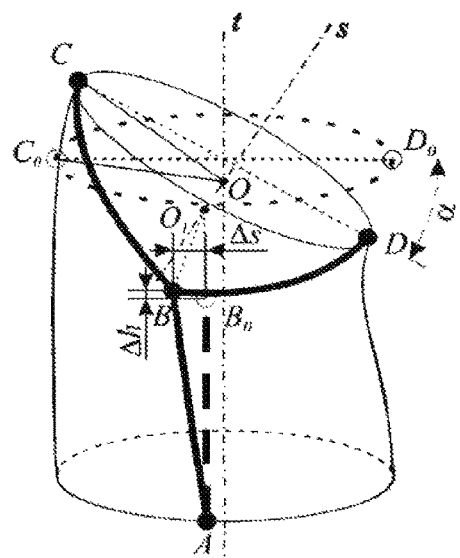
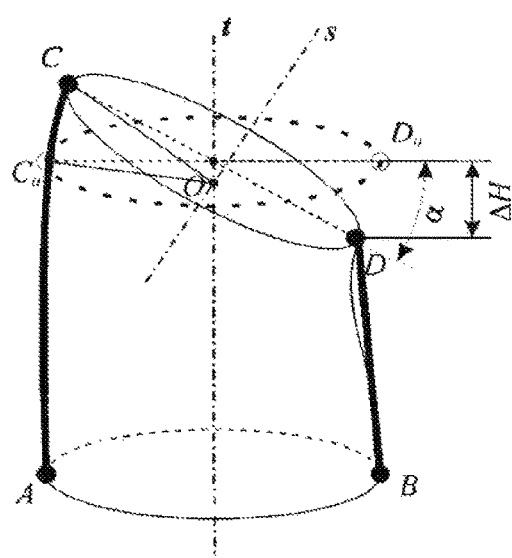
FIG. 7a  FIG. 7b

COMPOSITE WEARABLE ELECTRONIC COMMUNICATION DEVICE

FIELD OF THE INVENTION

The present invention relates to telecommunication devices, and more particularly, to a wearable mobile electronic device.

BACKGROUND OF THE RELATED ART

Nowadays, wearable electronic devices become more popular. In particular, this relates to spectacles combined with one or two displays located in front of a user's eyes. Despite predictions of an optimistic future of such devices, they have certain limitations due to large equipment providing a display operation. When such equipment is entirely positioned on a spectacle frame, it is not possible to provide enough capacity to its power source, especially when two displays are used. Even if only one display is used, the spectacle frame is still massive and inconvenient when wearing it; in addition, it changes appearance of the user. When such equipment is positioned beyond the spectacle frame, a wire connecting two parts of the electronic device must be provided. The wire hanging from the user's head tends to tangle, limits rotation of the head, and worsens appearance; if extra wire length for enabling the head rotation is not controlled, the wire may get caught on neighboring objects.

There are various types of electronic devices that are wearable on the human body, which are available on the market or disclosed in patent sources. They may be classified by a common feature, particularly, they may comprise two parts, each of which is wearable on different parts of the body, where the first (executive) part is provided in the form of a display or a headphone and is disposed on the user's head, and the second (equipment base) part is wearable on the user's neck and shoulders; both parts are connected to each other with signal and power wires. When the equipment base part for the spectacle frame containing a display or headphones is not disposed on the user's head but is connected to the destination of the signal (the display or headphones) by a flexible joint, then both these device types may be classified by a common feature of the engineering problem to be solved, which feature is providing effective connection for an electronic device being wearable on the user's body and comprising two parts, while the first part is disposed on the user's head contains a display and/or headphones, and the second part is disposed on the user's neck and shoulders contains an equipment base for the first part.

Any connections like those mentioned above comprise movable and fixed parts (being movable or fixed in relation to other parts of the device or in relation to the human body part on which they are disposed). Reducing a length of the movable parts' wires, placing the movable parts on a plane, making the fixed parts adjacent to the human body, and affixing the fixed parts by means of tension allow reducing wire sag and correspondingly reducing risk of the wires being caught on. Moreover, this allows permanent wearing the device in a stand-by position when the spectacles with the display have been taken off, and improves an ability to wind the wires.

Disposition of the equipment base on the user's neck and shoulders provides a far wider scope of equipment and energy means for providing longer and better operation of the display. Additionally, it allows placing two displays (a separate display in front of each eye), thus providing stereoscopic effect owing to a binocular nature of human vision, and reducing risk of strabismus development being actual in the case when a display for only one eye is used.

When analyzing the prior art, one should consider all types of devices having flexible connection between the executive part (a display or headphones) being wearable on the human head, and the equipment base being wearable on any body part different from the head. Such devices include spectacles having displays; neck sets; players; telephones connected by wire to headphones placed in the ears, while the display and headphones are often narrowly spaced from each other in operational state, and they may be mounted on the same spectacle frame wearable on the head.

A device in the form of spectacles having a display located in front of one eye of the bearer is known (see U.S. Pat. No. D660,341), where an equipment base comprising power sources is mounted on the spectacle frame. This solution increases the spectacle frame weight, worsens appearance of the user and limits autonomous operating time of the device, since it is difficult to mount the equipment base and power source necessary for a considerably long autonomous operation of the device, on the spectacle frame. Moreover, it may be impossible to mount required equipment base on the spectacle frame, and this in turn impedes using two displays (a separate display in front of each eye), thus possibly causing strabismus and preventing use of the stereoscopic base of binocular vision for forming a stereoscopic image.

A device (see U.S. Pat. No. 8,038,292), is known wherein a cable connecting an optical element placed in front of the user's eyes to its equipment, and a power base hangs from the back surface of a lateral temple of the spectacles. The wire hanging from the head worsens appearance, impedes the head rotation and tends to tangle.

An electronic device Epson Moverio BT-200 in the form of spectacles is known, having two displays in front of a user's eyes. Its limitations are similar to the limitations of the above-mentioned device, since this device also has one cable hanging from the front part of a spectacle temple.

Known stereo headsets of a necklace, collar or neck loop type have predominantly two types of connection between earphones and the neck loop: headsets with two side nodes, in which earphone cords are connected with the neck loop and not connected between themselves, and headsets with a single back node, in which earphone cords are connected to each other and to the neck loop in the single node.

A conventional headset comprises earphones that are connected through cords to a supporting structure, which accommodates a signal transceiver and is connected to a necklace (neck loop) (see U.S. Pat. No. 7,416,099).

The headset comprises long unsecured sections of cords connecting the earphones with the neck loop, because the additional length is needed when the user rotates and moves the head relative to the torso. The headset has two nodes and the length of the movable portion of the cords in the headset is more than 19 cm. The cords hang freely along the entire length thereof in the air over the body surface, so they are slack and may tangle and cling to surrounding objects. In addition, the headset is difficult to wear under clothing, in both operational and non-operational state, i.e. when the earphones are taken off.

An earphone storage structure comprises a necklace, two fasteners formed in the two ends of the necklace, and stoppers (see U.S. Pat. No. 7,936,895). The size of the fasteners is less than the size of the stoppers and the size of the earphones, therefore, the earphones may be pulled out when they are not used. The stoppers are actually connection nodes, and this device relates to headsets with two side nodes. The earphone storage structure has the same limitations as the previous device: cords are slacking, and the structure is difficult to wear under clothing and to manage it over clothing.

A lanyard for a portable electronic device (see U.S. Pat. No. 7,650,007) comprises two side connection nodes and allows adjusting the length of earphone cords, but the lanyard does not eliminate sagging of the cords in an operational state.

In a necklace-type audio device (see WO 2012/015257 A1, publ. Feb. 2, 2012), earphone cables form a neck loop when they are attached at the ends to a jack disposed on the user's chest, and crossed through two rings disposed in the back of the necklace (neck loop), the rings being adapted to adjust the length of the neck loop and earphone cables. In this device, the length of the cords connecting an earphone to the necklace (neck loop) is even longer than in necklace-type headsets with two side nodes; this fact contributes to slacking of the cords, and peculiarities of adjusting the lengths of cords in the headset eliminates the possibility of wearing it under clothes.

Therefore, the conventional devices, first, comprise excessively long unsecured sections of cords that connect the head part of a device or a headset with a neck loop (in headsets with a single node the length of freely hanging cords is about 19 cm, and in headsets with two side units it is about 25 cm) and, second, unsecured sections of cords in the conventional devices do not fit to the body surface. The cord slack cannot be fully removed without restricting the freedom of movement of the user's head. Therefore, when the devices are used the cords either slack, tangle and cling to surrounding objects, or restrict the freedom of movement.

Therefore, no constant wear device has been designed up until the present moment, which would have a small total length of freely hanging cords snuggly fitted to the body and creating no obstacles to movements of the head. Provision of such a device would improve the ease of use, secure fixation to the user's body, and prevent failures caused by the cords clinging to surrounding objects.

Generally, the wire sag depends on the following factors:

(a) the length of the movable part of the wires between fixed points; in all known spectacles with displays using a wire for connecting to the equipment base that is wearable on any human body part different from the head, and in all neck sets also using a wire between the neck loop and the headphones located in the auricles, this length corresponds to the length of the wire between the headphone (or the spectacle frame in the case of spectacles having displays) and the neck loop; thus, the shorter the movable part of the wires, the less the wire sag is, (b) tension of the wire, (c) degree of gap of the wire being adjacent to the human body, and (d) position of the wires; wires disposed on a plane do not sag, unlike wires hanging in the air or disposed over natural valleys of the user's body.

The action of the above factors on the example of the known devices and the device according to the invention illustrated in the drawings and will be explained below.

Further, explanation of reasons is provided for proposed design of a device being wearable on the human body, the device comprising two parts, one part being wearable on the user's head and possibly including a display and/or headphone(s), and the other part which is an equipment base being wearable on the user's neck, shoulders and chest, and a flexible connection between these two parts.

SUMMARY OF THE INVENTION

One of the objectives of this invention is to provide a wearable electronic communication device comprising two parts, wherein one part (e.g., a wearable display) is fixed on the user's head while wearing the device, and the other part (e.g., an equipment base of the display) is disposed on the user's neck, shoulders and chest, wherein each wire connecting these two parts comprises movable and fixed parts. Reduction of the movable part length of the wires, disposition of the movable parts on a plane, disposition of the fixed parts adjacent to the user's body surface, and fixation of the fixed parts by means of tension provides less sag of the headphone wires and, correspondingly, reduces risk of the wires being caught on.

In addition, this solution allows proper placing a display control interface and a massive equipment base of the display, using the headphones and the constantly wearable neck part of the device even when the spectacles with display have been removed, and providing possibility of winding the rear wires of the wearable device with no taking it off.

The objective is accomplished in a composite wearable electronic communication device comprising a neck loop bearing at least one electric connector, a spectacle frame bearing at least one electric connector, the spectacle frame comprising a front bar comprising in its central part a nose support for abutting on the bridge of the user's nose while wearing the spectacle frame, and two lateral temples, wherein one end of each lateral temple is connected to one of two lateral ends of the front bar, disposed oppositely astride the nose support; a flexible adapter comprising two wires, wherein one of the wires is connected to one of the lateral temples, and the other wire is connected to the other lateral temple, wherein at least one of the wires is electrically connected to the electric connector disposed on the spectacle frame, and the other end of this wire is electrically connected to the electric connector disposed on the neck loop; wherein the two wires of the flexible adapter are connected to the neck loop such that points of connection of the two wires to the neck loop are disposed in close proximity to each other and form a dorsal wire node disposed on the lower dorsal part of the user's neck while wearing the wearable device.

In addition, the two wires are mechanically connected to each other in the wire portions between the spectacle frame and the dorsal wire node, thus forming a suboccipital wire node in the point of connection of the wires, the suboccipital wire node disposed below the user's occiput while wearing the wearable device.

Preferably, when the wearable device is worn by the user in the operation position, the wires are disposed in a tensioned manner along the right and left temporal and occipital surfaces of the head, in the portions between the points of connection of the wires to the lateral temples and the suboccipital wire node.

Preferably, when the wearable device is worn by the user in the operation position, the dorsal wire node is disposed in the area of the seventh cervical vertebra, the suboccipital wire node is disposed in the area of the exterior occipital tuber, and the length of the wire portion between the suboccipital wire node and the dorsal wire node depends on the maximal distance between the first cervical vertebra and the seventh cervical vertebra of the user, the length being measured along the dorsal surface of the neck when the head is turned sideways and simultaneously tilted downwards.

Preferably, the wire portion between the suboccipital wire node and the dorsal wire node has a length in the range from 5 cm to 10 cm. Preferably, the suboccipital wire node is in the form of a clip configured to be relocated along the wires in order to adjust the length of the wires. Preferably, the dorsal wire node comprises an electric connector for disconnecting the neck loop from the spectacle frame. Preferably, the suboccipital wire node comprises an electric connector for disconnecting the neck loop from the spectacle frame.

Preferably, the wearable device further comprises a wire winding mechanism for the wires disposed between the suboccipital wire node and the dorsal wire node, and a storage pocket for storing the wires in the wound position.

Preferably, the wearable device comprising a wire winding mechanism for the wires and a storage pocket for storing the wires further comprises a conical flexible net, wherein the cone point of the net is connected to the suboccipital wire node and the base of the net is connected to the edge circumference of the storage pocket.

Preferably, the wire winding mechanism comprises a reel with a spiral spring disposed inside thereof, and a string wound on the reel, wherein one end of the string is connected to the reel and the other end of the string is connected to the suboccipital wire node such that when the string is wound on the reel, the suboccipital wire node is pulled to the dorsal wire node and the wire portion between the suboccipital wire node and the dorsal wire node is disposed in the storage pocket.

Preferably, in some embodiments the wire winding mechanism comprises an electric motor.

Preferably, in some embodiments at least one wire is in the form of a wound spring in the wire portion between the suboccipital wire node and the dorsal wire node.

Preferably, in some embodiments the wearable device further comprises a spring disposed between the suboccipital wire node and the dorsal wire node. Preferably, in some embodiments the neck loop is open. Preferably, the spectacle frame comprises at least one visual information displaying device.

Preferably, the neck loop comprises at least one electronic unit electrically connected to the at least one visual information displaying device disposed on the spectacle frame. Preferably, the wearable device further comprises at least one power supply unit disposed on the neck loop. Preferably, the wearable device further comprises control means in the form of buttons and keys disposed on the neck loop.

Preferably, the connection between each lateral temple and the corresponding end of the front bar is in the form of a hinge. Preferably, the wearable device further comprises the spectacle frame comprises a photo camera and/or a video camera.

The objective is further accomplished in a composite wearable electronic communication device comprising: a neck loop bearing at least one electric connector; a spectacle frame comprising a front bar bearing at least one electric connector, wherein the front bar comprises in its central part a nose support for abutting on the bridge of the user's nose while wearing the spectacle frame; a flexible adapter comprising two wires, wherein one end of at least one of the wires is electrically connected to the electric connector of the front bar, and the other end of this wire is electrically connected to the electric connector of the neck loop, wherein each of two lateral ends of the front bar, disposed oppositely astride the nose support is connected to one of the wires of the flexible adapter; wherein the two wires are connected to the neck loop in close proximity to each other, thus forming a dorsal wire node disposed on the lower dorsal part of the user's neck while wearing the wearable device; wherein in addition, the two wires are mechanically connected to each other in the wire portions between the dorsal wire node and the front bar, thus forming a suboccipital wire node in the point of connection of the wires, the suboccipital wire node disposed below the user's occiput while wearing the wearable device, and the wires in the wire portions between the front bar and the suboccipital wire node are disposed above the auricle along the right and left temporal and occipital surfaces of the head.

Preferably, when the wearable device is worn by the user in the operation position the dorsal wire node is disposed in the area of the seventh cervical vertebra, the suboccipital wire node is disposed in the area of the exterior occipital tuber, and the length of the wire portion between the suboccipital wire node and the dorsal wire node is determined by the maximal distance between the first cervical vertebra and the seventh cervical vertebra of the user, the length being measured along the dorsal surface of the neck when the head is turned sidewards and simultaneously tilted downwards.

Preferably, the wire portion between the suboccipital wire node and the dorsal wire node has a length in the range from 5 cm to 10 cm. Preferably, the suboccipital wire node is in the form of a clip configured to be relocated along the wires in order to adjust the length of the wires. Preferably, the dorsal wire node comprises an electric connector for disconnecting the neck loop from the spectacle frame. Preferably, the suboccipital wire node comprises an electric connector for disconnecting the neck loop from the spectacle frame. Preferably, the wearable device further comprises a wire winding mechanism for the wires disposed between the suboccipital wire node and the dorsal wire node, and a storage pocket for storing the wires in the wound position.

Preferably, the front bar of the spectacle frame comprises at least one device for displaying visual information. Preferably, the neck loop comprises at least one electronic unit electrically connected to the at least one device for displaying visual information, disposed on the front bar of the spectacle frame. Preferably, the wearable device further comprises at least one power supply unit disposed on the neck loop. Preferably, the wearable device further comprises control means in the form of buttons and keys disposed on the neck loop. Preferably, in some embodiments the neck loop is open.

The technical effect provided by the present invention includes the ability to reduce the length of the movable portion of the cords between two parts of the wearable device, and the adherence of the stationary portion of the cord to the surface of the user's body and fixation of the stationary portion by tension substantially eliminate slack of the cords connecting them, which in turn, prevents breakage of cords and provide additional further opportunity for constant wear of the one part of the device by the user in operational state and with the spectacle frame taken off, because the cords do not impair the appearance of the user when worn in operational or non-operational state. Furthermore, a mechanism for full or partial winding up of the cords, when not in use, can be more easily arranged on the headset.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

In the drawings:

FIGS. 2a, 2b shows a mathematical model of the neck surface with a wearable device with two nodes, where the head is shown in normal position and rotated at angle π/2, according to the present invention;

FIGS. 3a, 3b shows a mathematical model of the neck surface with a wearable device with a single node, where the head is shown in normal position and rotated at angle π/2, according to the present invention;

FIGS. 6a, 6b shows a mathematical model of the neck surface with a wearable device with a single node, with two side nodes, when the head is tilted vertically, respectively, according to the invention;

FIGS. 7a, 7b shows a mathematical model of a head tilted sideway with a wearable device with two nodes and a headset with two side units, respectively, according to the invention;

DETAILED DESCRIPTION OF THE PREFERRED EMBODIMENTS

Figure 1:
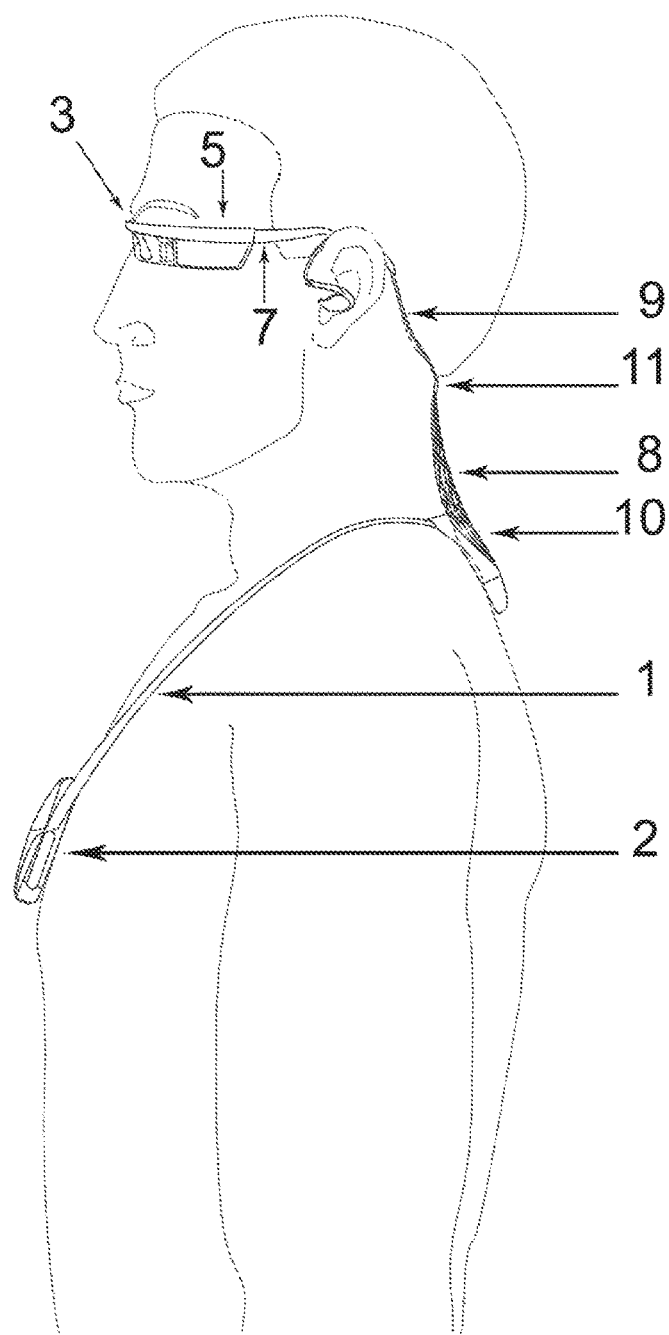
FIG. 1 shows a general view of a device in an operational state on the user, according to the present invention.

Reference will now be made in detail to the preferred embodiments of the present invention, examples of which are illustrated in the accompanying drawings.

The terms and expressions used herein shall have the meanings which may be different from the common meaning.

A headset is the set of mechanically connected cords, earphones and electrical connectors, configured with the capability to be worn on the user's body and designed for wired and wireless communications with a mobile electronic device.

An earphone is a device for personal listening to music, voice or other audio signals, which fits in the external ear of the user.

A neck loop is a piece of a linear material such as rope, wire, fabric, leather or chain, shaped in the form of a loop, ring, necklace, necktie, or collar; designed to be worn on the user's neck and chest and adapted to accommodate electrical and mechanical devices thereon.

An open loop is a loop with a gap, i.e., a half-loop.

An electrical connector is a detachable or non-detachable electrical device for mechanical connection of electrical circuits.

A cord (wire) is a flexible linear electric conductor comprising one or more twisted or adjacent, isolated or non-isolated leads, cords or individual cords, with or without an integral insulation above them.

A connection node is a point where two or more pieces of linear material, such as rope or cord, are mechanically connected to each other, or a point where they are attached to anything in close proximity to each other by binding, weaving, tying, gluing, enclosure in a general housing like cambric, or by another available means.

A display is a device for visual display of information.

Spectacle frame is a device to be worn on the user's head, containing a nose support, designed to fix any items before the user's eyes.

An electronic unit is an electrical device for corded and cordless communications, adapted to be disposed on a neck loop and electrically coupled to other components on the headset.

A control means is an interface component between a headset and user, configured as a mechanical, piezoelectric or another button or key having a bounded surface, a pressure on which leads to changing the function of the associated device.

Dorsal means being on the back.

Occipital means being on the back of the head.

Suboccipital means being under the back of the head.

Dorsal, occipital and suboccipital are used herein to describe the position of headset components on the surface of the user's body.

An excursion means movement, mobility of an organ or joint, or movement, mobility of wearable device components disposed on these organs or joints relative to other parts of the headset.

NFC (Near Field Communication) is a short-range wireless high-frequency communications method.

PAN (Personal Area Network) is a network organized around a person for communication among personal electronic devices, such as a smartphones, laptops, cordless and corded headsets. Standard wireless networks currently include, for example, Bluetooth, Zigbee, Piconet, Wi-Fi, Ultra-Wide Band, Kleer, NFC.

In the instant invention, the equipment base for the display mounted on the spectacle frame in front of user's eyes is disposed on a device provided in the form of a necklace or a loop or an open loop (a half-loop) wearable on the user's neck, shoulders and chest. Unlike other similar devices, the joint between the head-wearable part and the neck-wearable part of the device is provided in such a way that the number of hanging wires is minimized, these wires are not caught by neighboring objects, the joint itself is disposed on the rear side of the neck and is not visible to people around the user. The chest-wearable part of the device can be disposed under clothes, but the device still can be controlled through the clothes without visual contact with the keys located on the neck loop. Upon removing the spectacle frame with the display mounted thereon from the user's head, the spectacle frame may be disconnected from the chest-wearable part of the device, so the latter may be used as a chest set having headphones to be connected to a mobile phone, or alternatively the chest-wearable part of the device itself may be a mobile phone (or a smart phone), since the possibility of talking via microphones located on the neck loop and the possibility of listening via the headphones are still provided in this solution.

When a user wears an electronic device (FIG. 1), wherein the part, being wearable on the user's body is formed as a neck-loop 1 or an open-loop (half loop), a wire connecting node, that connects the part being wearable on the user's head to a neck loop 1, rests on the dorsal surface of the user's neck, in the region of the seventh cervical vertebra. Slightly lower on the human body there is a trough deepening, lying between the spinous and transverse processes of the vertebrae, sulcus dorsalis, at the level of the second-third thoracic vertebrae in the interscapular region, where a depression of various depths of about 4×5 cm (depending on the constitution and development of subcutaneous fat) is formed at the place of attachment on the medial edges of both blades of serratus anterior muscle, and a large and minor rhomboids muscles (musculae rhomboidei major et minor). When the spectacle frame is removed, the depression may receive a cord winding mechanism and a suboccipital node storage pocket, without projecting above the surface of the body and so without causing any inconvenience to the user.

From the cord connection node on the neck loop the cords run up on the dorsal surface of the neck to the back of the head, on the paravertebral deepening, sulcus costae vertebralis major, not reaching the outside occipital protuberance at the level of the first-second cervical vertebrae, where an additional cord connection node, suboccipital node 11, is appropriate to arrange. If the cords are directed in a V manner from the suboccipital node in the oblique anterior-upward direction slightly above or at the hairline, which almost coincides with the upper occipital skull line, through the mastoid regions (regiones mastoideae) of the neck, above the mastoid processes, through the projection of ligamentum auriculare superior, which attaches the top part of the auricular cartilage to the squamous part of the temporal bone to a spectacle frame, then the stable position of the suboccipital cord connection node will be provided by the availability of fixing anatomical structures at the datum point, such as the external occipital protuberance and lateral occipital projections, while a snug fit of the cords on the scalp is provided by stretching them on the dorsal surface of the head and neck in the places where the cords pass like a girth due to the partial hook-like overlap of the cords through the ligamentum auriculare with additional fixing of the cords on the lateral temples and (or) earphones inside the auricle.

With such attachment, only the cords in section 9 between nodes 10 and 11 are movable, and only this section may have a slack to compensate for the cord length, which changes when the head turns in the horizontal plane, tilts back, rocks from side to side, as well as when the movements are combined, that is, in all options that can arise in closed kinematic chains of the neck.

Cords 9 are relatively snug fitted to the scalp and fixed relative to the user's head, and their length does not vary at all the above movements, or varies so little that these variations can be neglected. Adherence and immobility of the cords 9 are also promoted by the cellular connective tissue structure of the subcutaneous fat of the occipital region, a minor displacement of the skin in the area, the presence of Langer's lines running in the transverse direction in the skin, as well as the passage of the cord on a hollow of the postaural cavity, the hook-like overlap of the cords, fixing the cord to the lateral temple or (and) positioning the earphones in the outer ear.

In terms of biomechanics it should be noted that movements of the head are described on the basis of closed kinematic patterns, and extrapolation of even fairly complex combinations of head movements to the fixation points can be considered in only one narrative category—as lengthening-shortening of the cord section between the dorsal cord connection node on the neck loop and the cord connection suboccipital node, which is almost stationary relative to the head and lies under the outer posterior occipital protuberance.

To construct a closed kinematic model, a headset can be represented as consisting of two basic parts and a movable connection thereof (FIG. 1).

A first part (head part) is stationary relative to the user's head, comprises a spectacle frame 3, two lateral temples or two flexible cords enveloping the auricle from above, and a suboccipital node 11.

A second part is stationary relative to the user's body, comprises a neck loop (or half loop) 1 and a cord connection node disposed on the neck loop (or half loop) on the dorsal surface of the neck, a dorsal node 10.

As shown in FIG. 1, positions of the cord connection nodes has been chosen at reference numeral 10, point A (FIGS. 2a, 2b) and reference numeral 11, point B (FIGS. 2a, 2b). In this case, the length of the free-hanging cord 9 in the section between the nodes should be minimal.

To determine the length of section AB, variations in the distance between points, A and B when the head turns, are considered. In this case, "distance" is the length of the geodesic line connecting points A and B on the surface of the neck (FIG. 2b). First, define the extension of the cord when the head rotates sideways. Maximum angle of rotation of the head is 90°. Determine the AB distance.

To determine the length of the geodesic line it is necessary to describe mathematically the surface of the neck and possible movements of the head and neck. The neck surface can be represented with sufficient accuracy as a cylinder (FIG. 2a). Head and neck can make the following motions: bending-tilting forward, extension/tilting backward, abduction and adduction/tilting to the left and to the right, turns to the left and to the right. High mobility of the cervical spine is due to its segmentation: having a height of about 13 cm, it contains seven medium-sized vertebrae and six high intervertebral discs. Between the first cervical vertebrae and the occipital bone, in the atlantal-occipital joint, adduction/abduction and flexion/extension of the head are performed, and between the first and second cervical vertebra turns of the head to the right and the left are performed. The joint work of these joints provides for the head movement about three axes. Thus, combined movements of the head and neck are made in relation to the body, while independent movements of the head are made in relation to the neck. This is because the cervical spine is very flexible, and independent movements are possible between the first and second cervical vertebrae.

Consider the behavior of the kinematic model of the headset when the head rotates in the horizontal plane.

When the head rotates in the horizontal plane, the neck twists mainly in the region between the first and second vertebrae. Moreover, since the cervical spine is located closer the back of the neck, the twisting axis is also close to the back surface of the cylinder. Since the twisting is performed only in the upper part of the cylinder about a non-central axis, the cylinder surface is distorted. The distortion is most strongly manifested in the region of the first and second cervical vertebrae, just where point B lies. The main part of the geodesic line passes below the distortion, so in the calculations we assume the surface is cylindrical. An important issue is the determination of the position of point B when the upper part of the cylinder is twisted to a maximum angle $\alpha=\pi/2$. Since ears are symmetric about the twisting axis, that is the axis of the vertebral column, and the point B is fixed by the taut cords in symmetrical position as well, the position of point B can be expected in the next central angle $\varphi$ (FIG. 2b).

$$\varphi = \arcsin\left(\frac{R-D}{R}\right) \quad (1)$$

The height of point B will not change at rotation either because it is fixed by the taut cords, the ends of which are connected to the spectacle frame.

Consider the task of geodesic line of a cylinder having a base radius R and a height h (FIG. 2b). The line passes through two diametrically opposite points on a different basis.

Its length is:

$$ds \leq \sqrt{dx^2+dy^2+dz^2}$$

Since the curve lies on the surface of the cylinder, it is convenient to use cylindrical coordinates, with $dx^2+dy^2=R^2 dy^2$, where $\varphi$ is the polar angle (FIG. 2b). In polar coordinates, the task reduces to finding a dependence $z(\varphi)$, at which the length of the curve is minimal or the function:

$$S = \int_0^{\varphi_0} \sqrt{R^2 + z'^2}\, d\varphi \quad (2)$$

is minimal.

From the calculus of variations, it is known that minimum is reached for the curve that satisfies the Euler equation, in this case:

$$\left(\frac{z'}{\sqrt{R^2+z'^2}}\right)' = 0 \quad (3)$$

It follows that $z'(\varphi)=a$, where a is the constant factor, then $z(\varphi)=a\times\varphi+b$. Coefficients are determined though boundary points A (R,0,0), the attachment point of the lower clip, and B (R, $\varphi_0$,h) with the polar angle $\varphi=0$ being at point A and equal to $\varphi_0$ at point B. Then the coefficients are of the form: $a=h/\varphi_0$, $b=0$. Then $z(\varphi)=\varphi\times h/\varphi_0$. And the length of the curve is equal to the value of the function, i.e.:

$$S = \int_0^{\varphi_0} \sqrt{R^2 + h^2/\varphi_0^2}\, d\varphi = \sqrt{\varphi_0^2 R^2 + h^2} \quad (4)$$

Thus, variation in distance AB or mobility of cords $\Delta S$ is:

$$\Delta S = \sqrt{h^2+R^2\varphi_0^2}-h \quad (5)$$

where R—the radius of the cylinder, $\varphi_0$—the angle of rotation of node B, defined relative to the central axis of the cylinder, h—the height of the node. With regard to expression (1), we get the expression for mobility of cords:

$$\Delta S_t = \sqrt{h^2 + R^2\arcsin^2\left(\frac{R-D}{R}\right)} - h \quad (6)$$

Now consider for comparison a variation in the length of cords at horizontal rotation of the head in conventional devices. FIG. 3a shows an example of such a device. In this case, cords are clamped at point A, and the movable part is the entire cord from point A to earphones or ends of lateral temples disposed at points C and D. Conventionally denote the device as a single node device. Thus, mobility of the cords can be determined from the difference between the distances from point A and D when the head rotates at the angle of 90° in one direction and in the other direction, since while the distance or the geodesic line length increases in one direction, it decreases in the other direction. These two distances can be determined in FIG. 3b, where a minimum distance is the length of line AC, and a maximum distance corresponds to line AD. As a result, mobility of the cords can be found from the expression (5) with the assumption of $h=H$ and $\varphi_0=\pi$, and it has the form:

$$\Delta S_{t1}=\sqrt{H^2+R^2\pi^2}-H \quad (7)$$

Figure 4A:
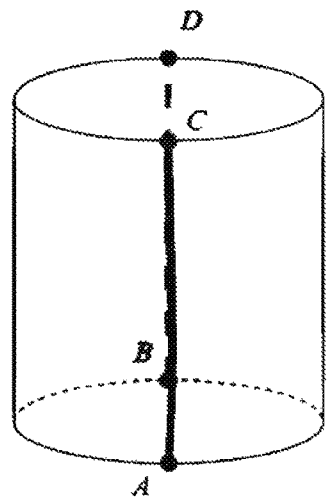
FIGS. 4a, 4b shows a mathematical model of the neck surface with a wearable device with two side nodes, where the head is shown in normal position and rotated at angle π/2, according to the present invention.
Figure 4B:
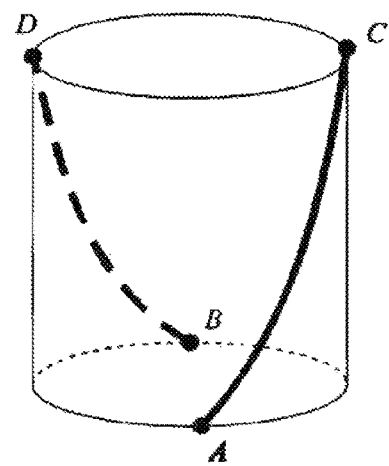

Consider another type of a device, which will be conventionally called a device with two side nodes (FIG. 4a). In this case assume that the cord, at rotation, always passes through points at the base of the cylinder, i.e., points A and B, cord connection nodes. Then the minimum distance between points A and C or B and D is H. The maximum distance when the head is rotated to 90° is shown by geodesic lines AC and BD (FIG. 4b). As a result, mobility of the cords is also determined from expression (5) with the assumption of h=H and $\varphi_0=\pi/2$, and is defined by the following expression:

$$\Delta S_{t2} = \sqrt{H^2 + R^2\pi^2/4} - H \qquad (8).$$

Next, consider behavior of the kinematic model when the head tilts forward and backward in the vertical plane.

Figure 5A:
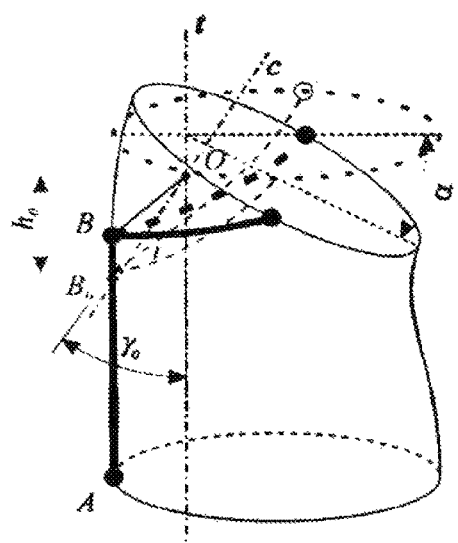
FIG. 5a shows a mathematical model of the neck surface with a wearable device with two nodes where the head is tilted vertically, according to the invention.

Tilts of the head are performed by rotation of the head around the axis passing between the first cervical vertebra and the occipital bone. The tilt is often accompanied by a tilt of the entire cervical spine. In a device with two nodes, the tilt of the neck has a little effect on distance AB, but rotation of the head has a significant impact, since node B is disposed directly on the occipital part. Thus, knowing distance from B to axis of rotation r and angle of rotation $\alpha$ (FIG. 5a), shift of node B can be estimated as $$BB_0 = r\alpha \qquad (9)$$

Figure 5B:
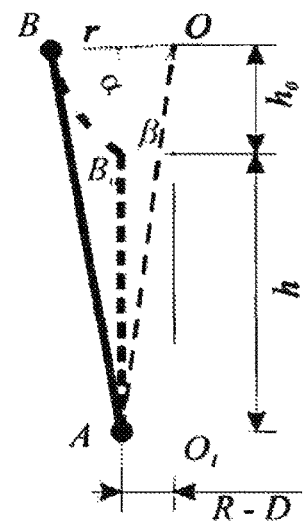
FIG. 5b shows the calculation of the length of segment AB when the head is tilted forward at arbitrary angle α, according to the invention.

Obtain an expression for the length of segment AB at arbitrary angle $\alpha$ from the triangle AOB (FIG. 5b):

$$AB^2 = AO^2 + r^2 - 2AO \, r \cos(\alpha+\beta) \qquad (10)$$

The distance to axis r can be determined though the distance from the back surface of the neck to the center of the cervical spine, i.e., R-D, and the difference of heights of point B and the axis of rotation of the head $h_0$:

$$r = \sqrt{(R-D)^2 + h_0^2} \qquad (11)$$

From triangle OO1A obtain the following expression:

$$AO = \sqrt{(R-D)^2 + (h+h_0)^2} \qquad (12)$$

The expression for angle $\beta$ can be obtained from expressions (10), (11) and (12) by substituting $\alpha=0$, AB=h.

$$\beta = \arccos \frac{(R-D)^2 + hh_0 + h_0^2}{\sqrt{((R-D)^2 + (h+h_0)^2)((R-D)^2 + h_0^2)}} \qquad (13)$$

Thus, the expression for the AB has the form:

$$AB(\alpha) = \sqrt{\begin{aligned} 2(R-D)^2 + (h+h_0)^2 + h_0^2 - \\ 2\sqrt{(R-D)^2 + (h+h_0)^2)((R-D)^2 + h_0^2)} \cos(\alpha+\beta) \end{aligned}} \qquad (14)$$

It should be noted that in case of tilting the head backward, the expression (14) is no longer true, because there is no tension of the skin and soft tissues of the dorsal part of the neck. In this case, it is appropriate to estimate distance $BB_0$ as the difference between heights of points B and $B_0$.

$$\Delta h = r(\cos(\gamma_0+\alpha) - \cos\gamma_0) \qquad (15)$$

As a result, mobility of the cords is calculated from expression 114) by substituting $\alpha=\alpha_m$ (maximum tilt angle), and (15) by substituting $\alpha=-\alpha_m$:

$$\Delta S_c = AB(\alpha_m) - \sqrt{(R-D)^2 + h_0^2}(\cos(\gamma_0-\alpha_m) - \cos\gamma_0) \qquad (16)$$

Apparently, $\alpha_m$ cannot exceed $\gamma_0$ due to the limit on deformation of the neck. To assess mobility of the cords we may assume $\alpha_m = \gamma_0$, then with regard to expression (14) obtain:

$$\Delta S_c = AB(\gamma_0) - \sqrt{(R-D)^2 + h_0^2}(1 - \cos\gamma_0) \qquad (17)$$

In case of devices with a single node or with two side nodes rotation in the vertical plane affects the height of points C and D. A variation in the latter, $\Delta h_0$, can be determined if relative distance r0 between axis CD and the axis of rotation, as well as angular position $\alpha 0$ of the axes, are known (FIG. 6a):

$$\Delta h_0 = r_0(\cos\alpha_0 - \cos(\alpha_0+\alpha)) \qquad (18)$$

As a result, variation in the distance or mobility of cords for a device with a single node can be obtained from formula (4) with $H-\Delta h_0$ set instead of h and $\varphi=\pi/2$. In this case, angle $\alpha$ varies in the range $-\alpha_m < \alpha < \alpha_m$, and the height varies in the range:

$$\Delta h_{01} = r_0(\cos\alpha_0 - \cos(\alpha_0 - \alpha m)) < \Delta h_0 < r_0(\cos\alpha_0 - \cos(\alpha_0 - \alpha_m)) = \Delta h_{02} \qquad (19)$$

$$\Delta S_{c1} = \sqrt{(H-\Delta h_{01})^2 + R^2\pi^2/4} - \sqrt{(H-\Delta h_{02})^2 + R^2\pi^2/4} \qquad (20)$$

FIG. 6b illustrates the case of a device with two side nodes. Mobility of the cords can be estimated through variation in heights of points C and D. Then, from expression (14), obtain mobility of the cords in the following form:

$$\Delta S_{c1} = \Delta h_{02} - \Delta h_{01} \qquad (21)$$

Like the case of a device with two nodes, estimates $\alpha_m = \gamma_0 = \alpha_0$ are true. Then obtain the following estimates for mobility of cords:

$$\Delta S_{c1} = \sqrt{(H+r_0(1-\cos\gamma_0))^2 + R^2\pi^2/4} - \sqrt{(H-r_0(\cos\gamma_0-\cos 2\gamma_0))^2 + R^2\pi^2/4} \qquad (22)$$

$$\Delta S_{c2} = r_0(1-\cos 2\gamma_0) \qquad (23)$$

Also, consider behavior of the kinematic model when the head tilts sideway in the vertical plane.

When the head tilts sideway the movement of the head can be represented as rotation of the upper part of a cylinder about axis s, which passes approximately through point O of intersection of axes t and c.

In the case of a device with two nodes such rotation is accompanied by a shift of point B, which can be estimated through the distance to axis of rotation $O_1B_0$ (FIG. 7a). As seen in FIG. 7b: $O_1B_0 = h_0$. To determine the length of AB, it is necessary to determine horizontal shift $\Delta s$ and vertical shift $\Delta h$ of point B, because $AB = \sqrt{(h+\Delta h)^2 + \Delta s^2}$. In this case $\Delta h = h_0(1-\cos\alpha)$ and $\Delta s = h_0 \sin\alpha$. Then mobility of section AB when the head tilts sideway will changed to maximum angle $\alpha m$:

$$\Delta S_s = \sqrt{(h+h_0(1-\cos\alpha_m))^2 + h_0^2\sin^2\alpha_m} - h \qquad (24)$$

Now consider the case of a device with side nodes. In this case, variation in segments AC and BD can be accounted for by considering the shift of points C and D on arcs of a circle from points $C_0$ and $D_0$. The length of AC in the case of the head tilt shown in FIG. 7b can be found as:

$$AC = AC_0 + R_s\alpha = H + R_s\alpha \qquad (25)$$

Here $R_s$ is the radius of rotation about axis s, which can be found from triangle $COO_2$, where $OO_2$ can be found, given that the height of point O is $h+h_0$ (FIG. 5b), then $OO_2=H-h-h_0$, and $CO_2=R$, therefore:

$$CO=R_s\sqrt{(H-h-h_0)^2+R^2} \quad (26)$$

To determine BD only variation in the height of point D, $\Delta H=R_s \sin \alpha$, should be taken into account because the cord in this area is loose:

$$BD=H-\Delta H=H-R \sin \alpha \quad (27)$$

Considering maximum deflection angle $\alpha_m=45°$ the following expression can be obtained for mobility of cords:

$$\Delta S_{s2}=R_s\alpha_m+R \sin \alpha_m \quad (28)$$

Figure 8:
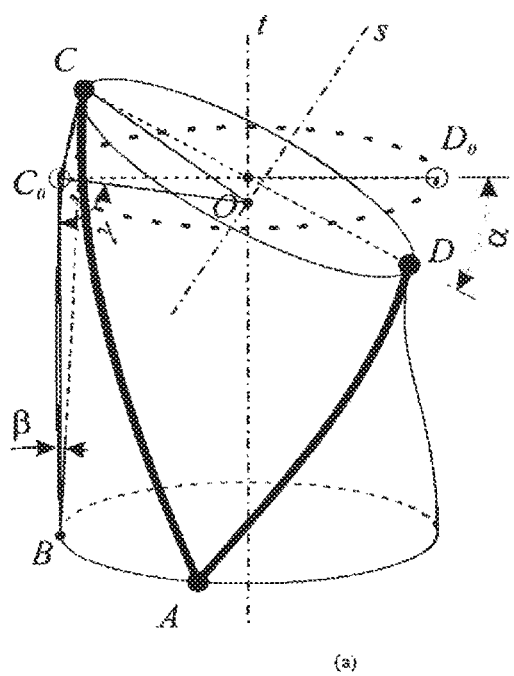
FIG. 8 shows a mathematical model of a head tilted sideway with a wearable device with a single node, according to the invention.

Now consider the case of a device with a single node (FIG. 8). In this case, the calculation is more complicated and requires special treatment for the length of geodesic line AC. In this task the surface of the neck can be described as a surface of an inclined cylinder. To do this, find the angle of inclination of the cylinder surface, $\beta$. From triangles $BCC_0$ and $OCC_0$ find $CC_0=2R_s \sin(\alpha/2)$;

$$BC=\sqrt{H^2+4R_s^2\sin^2(\alpha/2)-4HR_s\sin(\alpha/2)\sin(\alpha/2-\gamma)} \quad (29)$$

From triangle $BCC_0$ obtain:

$$BC/\sin(\pi/2-\alpha/2+\gamma)=2R_s \sin(\alpha/2)/\sin \beta$$

so obtain:

$$\beta=\arcsin(2R_s \sin(\alpha/2)\cos(\alpha/2-\gamma)/BC) \quad (30)$$

Here $$\gamma=\arc tg(R/(H-h-h_0)) \quad (31)$$

Therefore, $$AC=\sqrt{(BC(1-\sin\beta))^2+\pi^2R^2\cos^2\beta/4} \quad (32)$$

Figure 9:
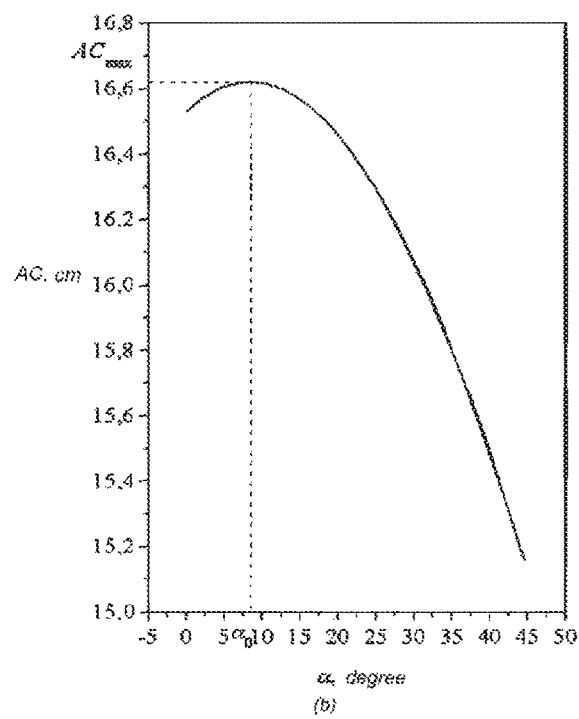
FIG. 9 shows the dependence of the length of geodesic line AC on tilt angle α of a head, according to the invention.

It should be noted that, taking into account the dependence of BC and $\beta$ on angle $\alpha$ from equations (29) and (30), we can expect a non-monotonic dependence of the line length $AC(\alpha)$. FIG. 9 shows this dependence for parameters listed in Table 1. It can be seen that AC reaches maximum $AC_{max}$=16.6 cm at angle $\alpha_0$=8.6°.

Now find the length of AD, because this line describes the minimum length of the cord. In this case we may consider that the height of the cylinder has changed to $\Delta H=R_s \sin \alpha$, then using the expression (27) obtain:

$$AD=\sqrt{(H-R_s\sin\alpha)^2+\pi^2R^2/4} \quad (33)$$

As a result, mobility of cords $\Delta S_{s1}$ is determined as the difference of the lengths of lines $AC_{max}$ and AD at the maximum angle of inclination, $\alpha m$:

$$\Delta S_{s1}=AC_{max}-\sqrt{(H-R\sin\alpha_m)^2+\pi^2R^2/4} \quad (34)$$

Table 1 shows the comparison of cord mobility for various types of electronic devices, including neck loop headsets. As seen in the table, an electronic device with two nodes, including a suboccipital node that is a headset, in which two cords are connected the head-mounted part of the device to the neck loop through a dorsal cord connection node in close proximity to each other and the cords have an additional point of fixation to each other, a suboccipital node; the cords have the lowest change of their lengths when the user's turns his head, as compared with conventional devices. This advantage applies to all kinds of movements of the head. Comfortable wear of the electronic device is determined by the maximum possible mobility of cords, respectively, the difference between the minimum and maximum possible length of loose cord, arising at different positions of the head. In an electronic device with two nodes the maximum length is determined by maximum distance AB between the nodes that is the length AB defined in expression (14). In a device with a single node, the maximum length of the cord is achieved when the head rotates to 90°:

$$L_{max\ 1}\sqrt{H^2+R^2\pi^2} \quad (35)$$

For an electronic device with two side nodes obtain the maximum length when the head tilts sideway:

$$L_{max\ 2}=H+R_s\alpha_m \quad (36)$$

Table 1 contains numerical estimates, from which it follows that the device with two nodes, including a suboccipital node has a minimum length of a maximum extended, but slack portion of cord. It should also be noted that the estimates obtained for a device with two side nodes have been deliberately reduced, because cords passing from points A and B to the transceiver are not taken into account, and account of them would significantly increase $L_{max2}$.

Figure 10:
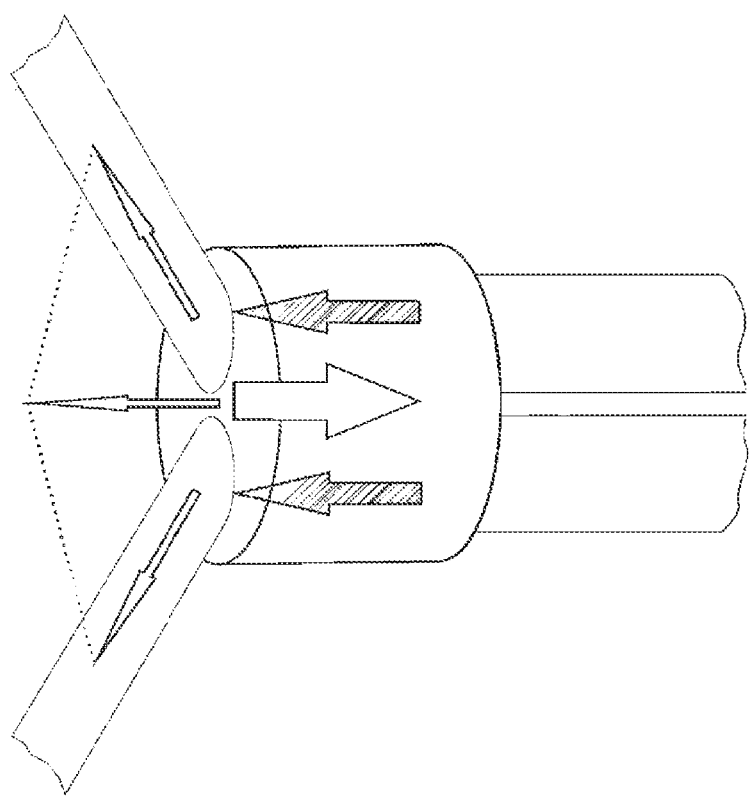
FIG. 10 is a vector diagram of forces, according to the invention.

Therefore, the availability of two optimally positioned nodes A and B contributes not only to reduction in slacking of the cords, but also provides tension of the cords emanating from node B to head-mounted part of the electronic device. Since these cords lie on the curved surface of the neck, the tension creates a pressure on the skin (FIG. 10). As a result of this pressure, there arises a friction force of the cord against the skin and a pressure force of the suboccipital cord connection node, node B, against soft tissues, while the difference of vectors of these forces leads to fixation of the cords on the scalp and further secures spectacle frame and/or earphones in the auricle. Thus, the fastening force is concentrated not only on the lateral temples and the auricles, but it is uniformly distributed over the entire length of the cord. Node B, i.e., the suboccipital cord connection node, is held in a stable position owing to the uniform distribution of various forces that arise in the occipital region at the specified arrangement geometry of the cords and their mutual coupling, taking into account human anatomical features.

FIG. 10 shows a vector diagram of projections of the forces acting on the suboccipital cord connection node, node B. Node B is fixed through tension of the cords. Thin arrows indicate tensile forces of the cords, the total of which creates pressure on the skin. As a result, node B experiences a force of reaction of the skin and surrounding tissues, indicated by wide arrow, that seeks to move the node down, and the arising forces of friction against the cord, marked with wide solid arrow, fix the position of node B. In this model, the tension of cords below the node was neglected, as its length has been chosen for optimal and the cord is loose, has an excess length of not more than 9.8 cm to ensure mobility of the cords in movements of the head and neck.

Table 1 summarizes results of comparison of cord mobility and maximum cord length in electronic devices with different geometries.

Figure 11:
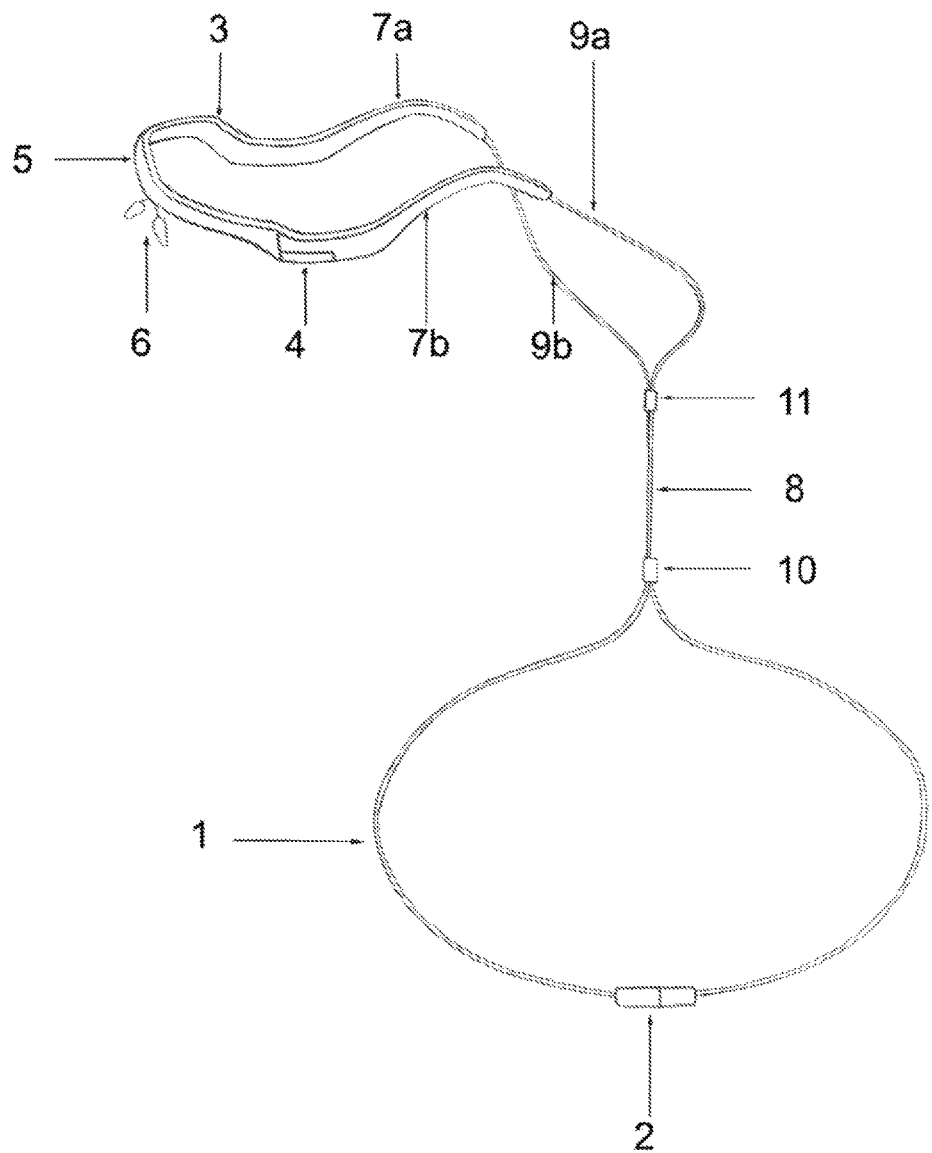
FIG. 11 is a general view of a wearable device in one embodiment, showing the main functional components according to the invention.

Further with reference to the figures, a composite wearable electronic communication device (FIG. 1, FIG. 11) comprises a neck loop 1 bearing at least one electric connector 2, a spectacle frame 3 bearing at least one electric connector 4, the spectacle frame comprising a front bar 5 comprising in its central part a nose support 6 for abutting on the bridge of the user's nose while wearing the spectacle frame, and two lateral temples 7a, 7b, wherein one end of each lateral temple is connected to one of two lateral ends of the front bar, disposed oppositely astride the nose support 6; a flexible adapter 8 comprising two wires 9a, 9b.

One of the wires is connected to one of the lateral temples, and the other wire is connected to the other lateral temple, wherein at least one of the wires is electrically connected to the electric connector 4 disposed on the spectacle frame, and the other end of this wire is electrically connected to the electric connector 2 that is disposed on the neck loop. The two wires 9a, 9b of the flexible adapter are connected to the neck loop 1 such that points of connection of the two wires to the neck loop are disposed in close proximity to each other and form a dorsal wire node 10 disposed on the lower dorsal part of the user's neck while wearing the wearable device. The two wires are mechanically connected to each other in the wire portions between the spectacle frame and the dorsal wire node, thus forming a suboccipital wire node 11 in the point of connection of the wires, the suboccipital wire node disposed below the user's occiput while wearing the wearable device.

Figure 12:
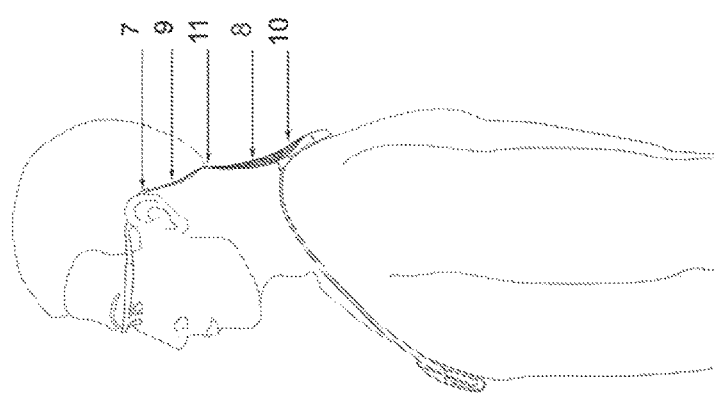
FIG. 12 shows an embodiment of a wearable device in operational state on the user, according to the invention.

When the wearable device is worn by user in an operational state (FIG. 12), the wires 9a, 9b are disposed in a tensioned manner along the right and left temporal and occipital surfaces of the head, in the portions between the points of connection of the wires to the lateral temples 7a, 7b and the suboccipital wire node 11 and the dorsal wire node 10 is disposed in the area of the seventh cervical vertebra. The suboccipital wire node 11 is disposed in the area of the exterior occipital tuber, and the length of the wire portion between the suboccipital wire node and the dorsal wire node depends on the maximum distance between the first cervical vertebra and the seventh cervical vertebra of the user, the length being measured along the dorsal surface of the neck when the head is turned sideways and simultaneously tilted downwards and the length is in the range from 5 cm to 10 cm.

Figure 13:
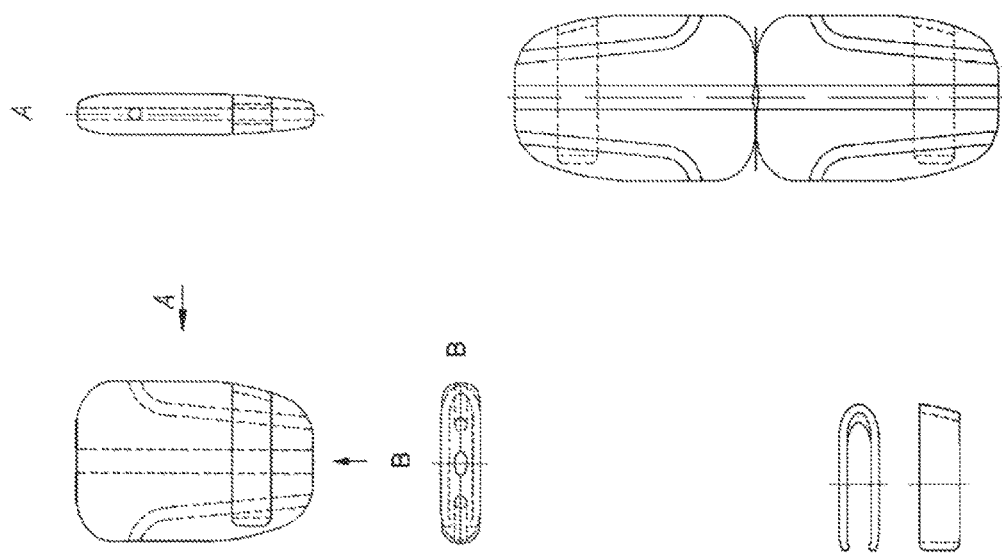
FIG. 13 shows a constructive solution of the clip, according to the invention.

In some embodiments (see FIG. 11) the suboccipital wire node 11 may be in the form of a clip configured to be relocated along the wires in order to adjust the length of the wires. FIG. 13 illustrates one embodiment of a clip.

In some embodiments (FIG. 14) the dorsal wire node comprises an electric connector 12 for disconnecting the neck loop from the spectacle frame. The suboccipital wire node may comprise an electric connector 13 for disconnecting the neck loop from the spectacle frame.

In preferred embodiments (FIG. 14) the wearable device further comprises a wire winding mechanism 14 for the wires disposed between the suboccipital wire node and the dorsal wire node, and a storage pocket 15 for storing the wires in the wound position and the wearable device further may comprise a conical flexible net 15. The cone point of the net is connected to the suboccipital wire node and the base of the net is connected to the edge circumference of the storage pocket.

Figure 15:
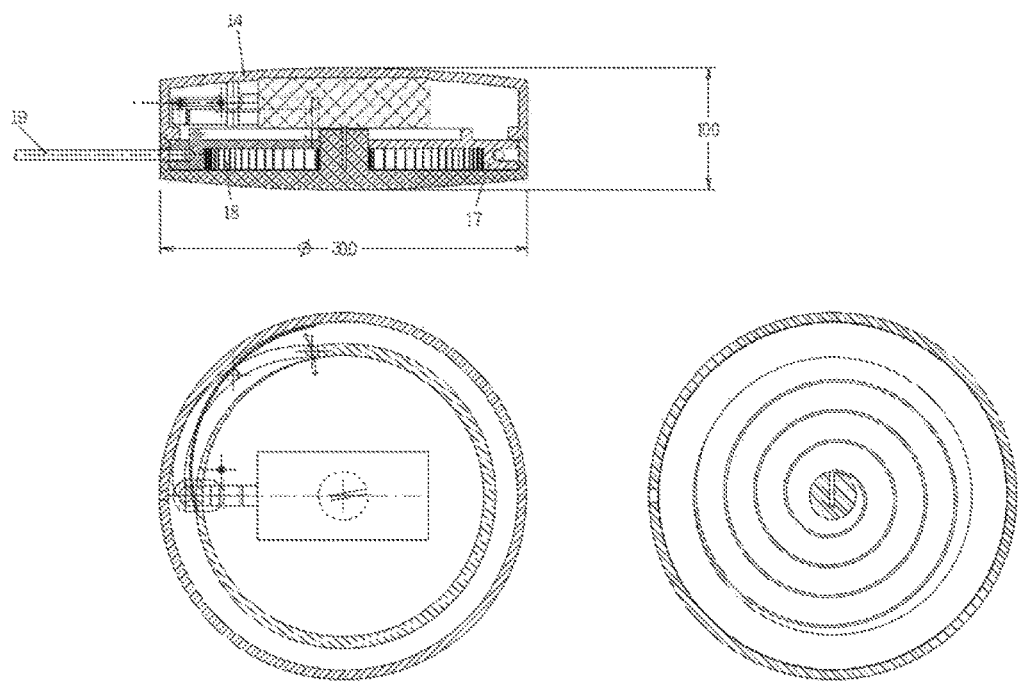
FIG. 15 shows an embodiment of a reel winding mechanism.

In some embodiments (see FIG. 15) the wire winding mechanism 14 comprises a reel 17 with a spiral spring 18 disposed inside thereof, and a string wound 19 on the reel. One end of the string is connected to the reel and the other end of the string is connected to the suboccipital wire node such that when the string is wound on the reel, the suboccipital wire node is pulled to the dorsal wire node and the wire portion between the suboccipital wire node and the dorsal wire node is disposed in the storage pocket. In some embodiments, the wire winding mechanism may comprise an electric motor.

Figure 16:
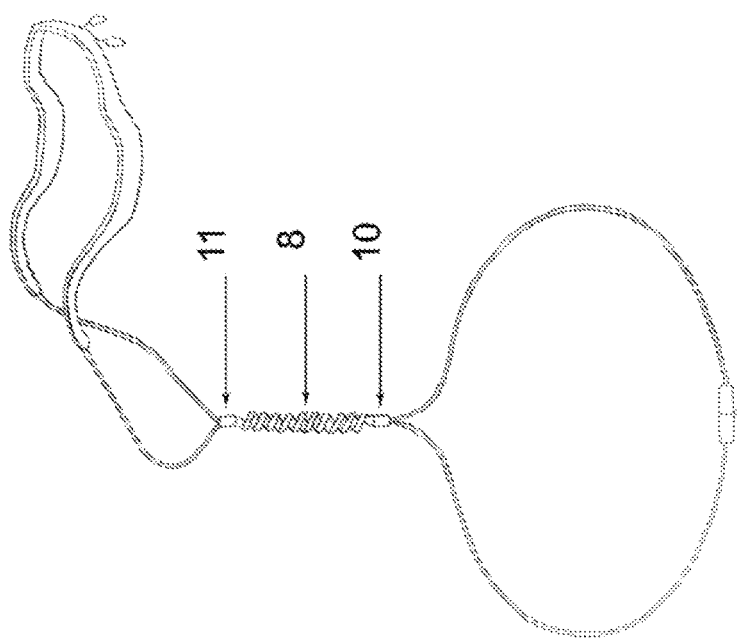
FIG. 16 shows an embodiment of a reel for a wearable device comprising a winding mechanism, according to the invention.

In some embodiments (see FIG. 16) at least one wire 6 is in the form of a wound spring in the wire portion between the suboccipital wire node 11 and the dorsal wire node 10. In some embodiments the wearable device further may comprise a spring disposed between the suboccipital wire node and the dorsal wire node.

Figure 17:
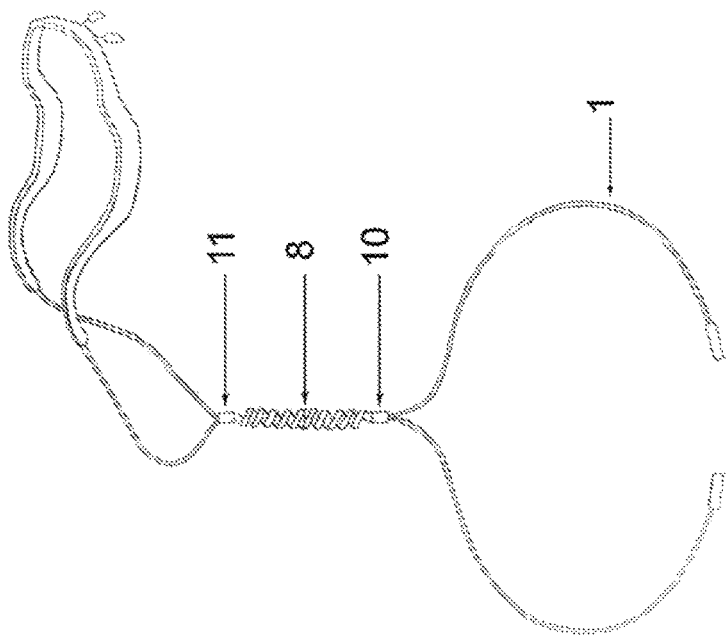
FIG. 17 shows an embodiment of a neck-loop made open, according to the invention.

FIG. 17 shows one embodiment, wherein the neck loop is open.

Figure 14:
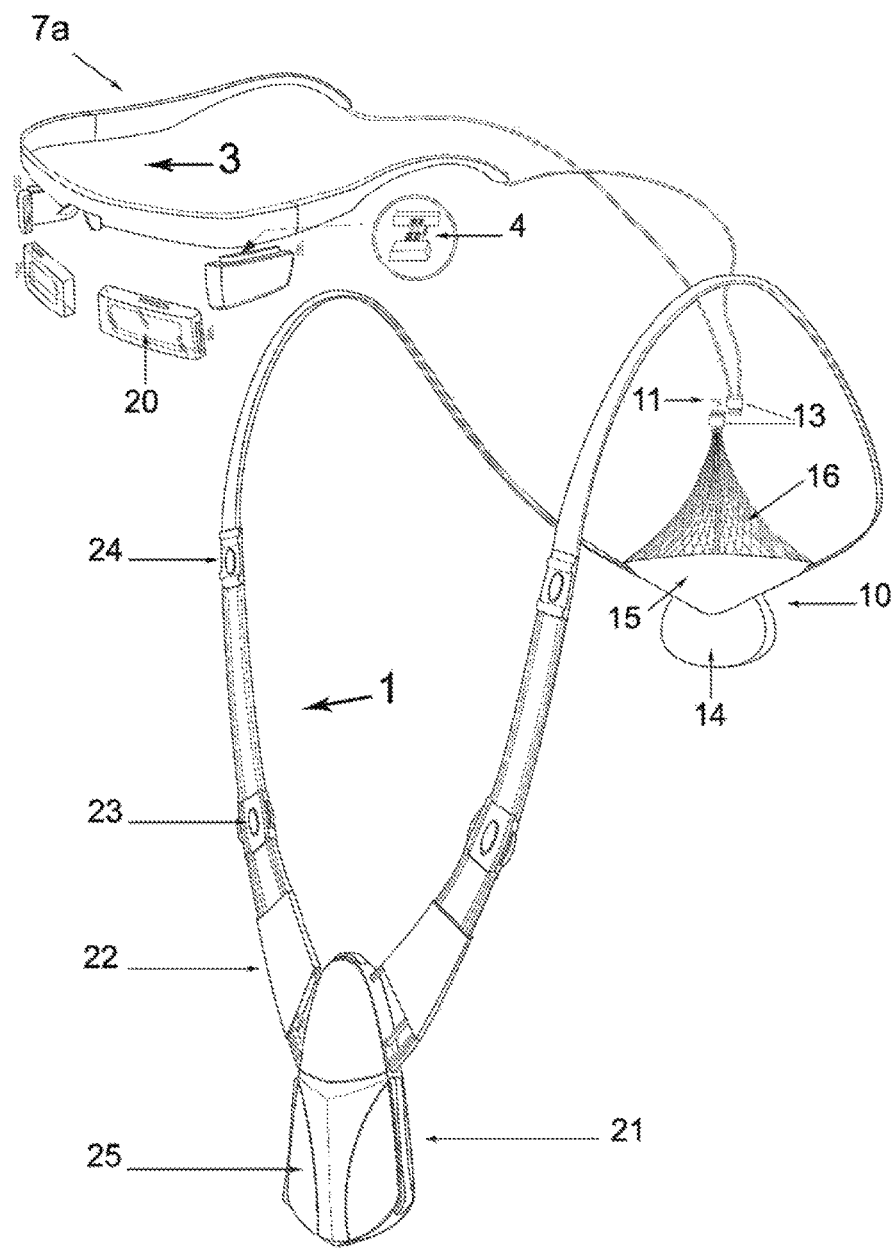
FIG. 14 is a general view of a wearable device in one embodiment, as a multifunctional device, showing main functional components, according to the invention.

In some embodiments, the spectacle frame comprises at least one visual information displaying device. The preferred embodiment is shown in FIG. 14.

In preferred embodiment the neck loop comprises at least one electronic unit 21 electrically connected to the at least one visual information displaying device 20 disposed on the spectacle frame 3.

In various embodiments the wearable device at least one power supply unit 22 disposed on the neck loop 1. The wearable device can further comprise control means, for example 23, 24, 25, in the form of buttons and/or keys disposed on the neck loop.

In some embodiments the connection between each lateral temple and the corresponding end of the front bar may be in the form of a hinge.

In some embodiments, the spectacle frame comprises a photo camera and/or a video camera.

Figure 18:
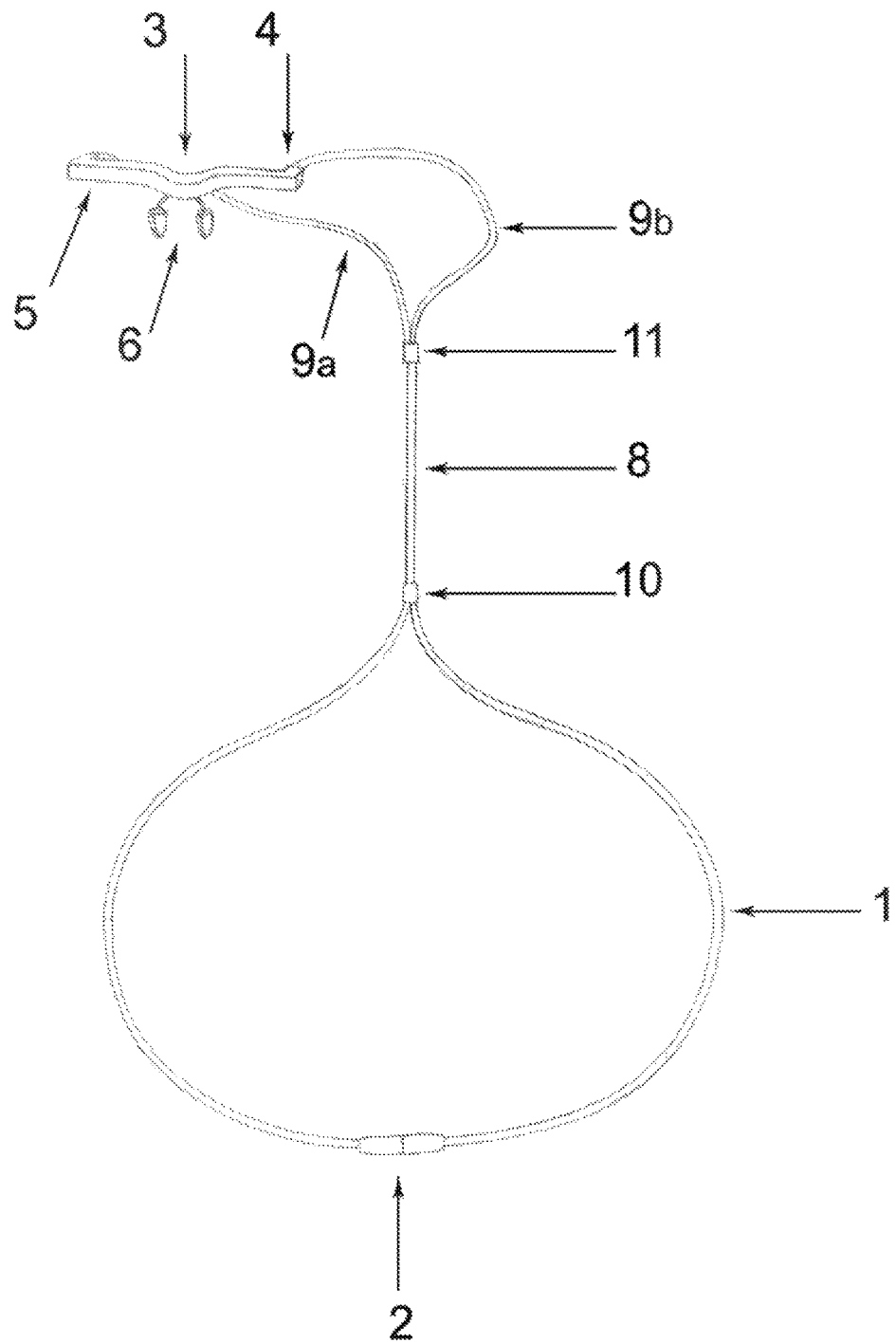
FIG. 18 shows a general view of a wearable device in one embodiment, showing the main functional components according to the invention.

A wearable device (see FIG. 18) may comprise a neck loop 1 bearing at least one electric connector 2, a spectacle frame 3 comprising a front bar 5 bearing at least one electric connector 4, wherein the front bar 5 comprises in its central part a nose support 6 for abutting on the bridge of the user's nose while wearing the spectacle frame, a flexible adapter 8 comprising two wires 9a, 9b, wherein one end of at least one of the wires is electrically connected to the electric connector 4 of the front bar, and the other end of this wire is electrically connected to the electric connector 2 of the neck loop. Each of two lateral ends of the front bar 5, is disposed oppositely astride the nose support is connected to one of the wires of the flexible adapter. The two wires are connected to the neck loop in close proximity to each other, thus forming a dorsal wire node 10 disposed on the lower dorsal part of the user's neck while wearing the wearable device. The two wires are mechanically connected to each other in the wire portions between the dorsal wire node and the front bar, thus forming a suboccipital wire node 11 in the point of connection of the wires, the suboccipital wire node disposed below the user's occiput while wearing the wearable device, and the wires in the wire portions between the front bar and the suboccipital wire node are disposed above the auricle along the right and left temporal and occipital surfaces of the head.

Figure 19:
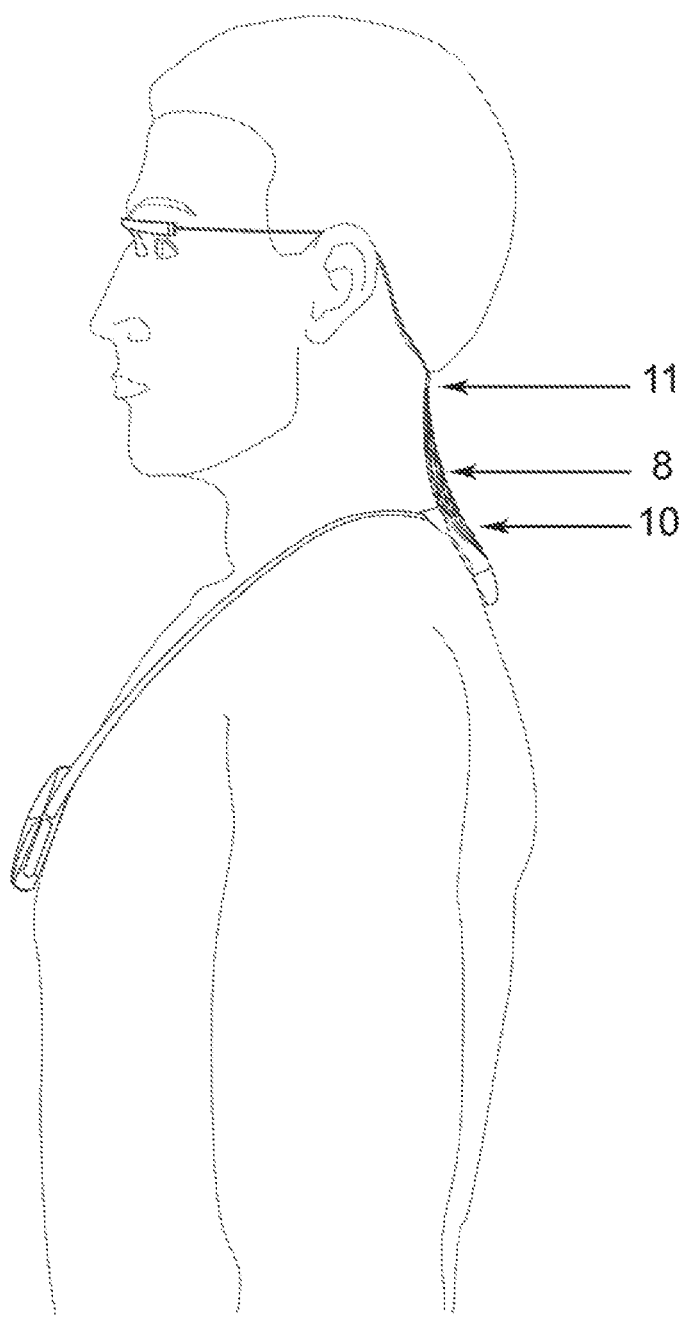
FIG. 19 shows a way of wearing a wearable device in an operational state, according to the invention.

When the wearable device is worn by user in operational state (see FIG. 19), the dorsal wire node 10 may be disposed in the area of the seventh cervical vertebra, the suboccipital wire node 11 may be disposed in the area of the exterior occipital tuber, and the length of the wire portion between the suboccipital wire node and the dorsal wire node is determined by the maximum distance between the first cervical vertebra and the seventh cervical vertebra of the user, the length being measured along the dorsal surface of the neck when the head is turned sideways and simultaneously tilted downwards and the said the length will be in the range from 5 cm to 10 cm.

In many embodiments the suboccipital wire node 10 may be in the form of a clip configured to be relocated along the wires in order to adjust the length of the wires.

Figure 20:
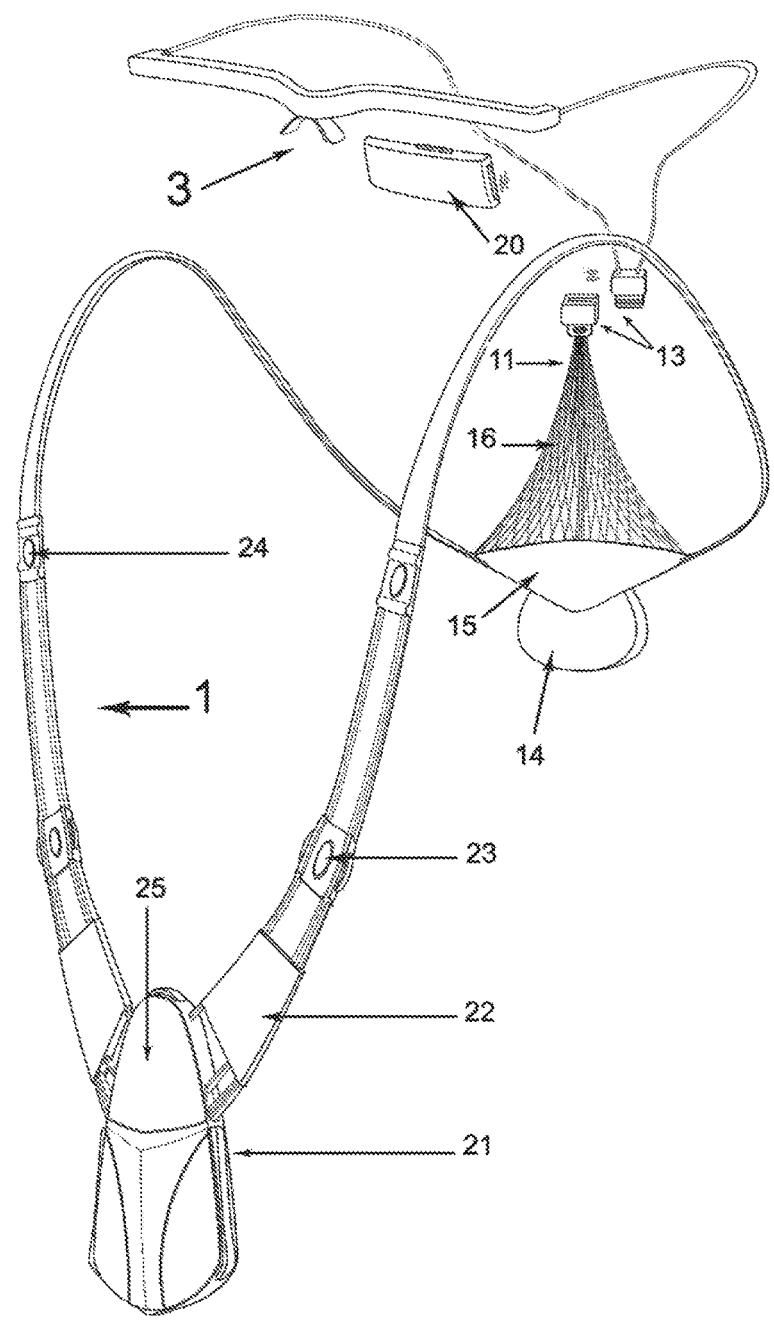
FIG. 20 shows a wearable device in preferred embodiment, wherein the spectacle frame does not contain lateral temples, according to the invention.

In many embodiments (see FIG. 20) the dorsal wire node 10 may comprise an electric connector for disconnecting the neck loop from the spectacle frame. The suboccipital wire node 11 may comprise an electric connector 13 for disconnecting the neck loop from the spectacle frame. FIG. 20 shows an embodiment of the wearable device further comprising a wire winding mechanism 14 for the wires disposed between the suboccipital wire node and the dorsal wire node, and a storage pocket 15 for storing the wires in the wound position.

FIG. 20 shows an embodiment of a wearable device wherein the front bar of the spectacle frame 5 comprises at least one device 20 for displaying visual information and the neck loop 1 may comprise at least one electronic unit 21 electrically connected to the at least one device 20 for displaying visual information, disposed on the front bar of the spectacle frame. The wearable device may further comprise at least one power supply unit 22 disposed on the neck loop 1 and control means 23, 24, 25 in the form of buttons and/or keys disposed on the neck loop.

Figure 21:
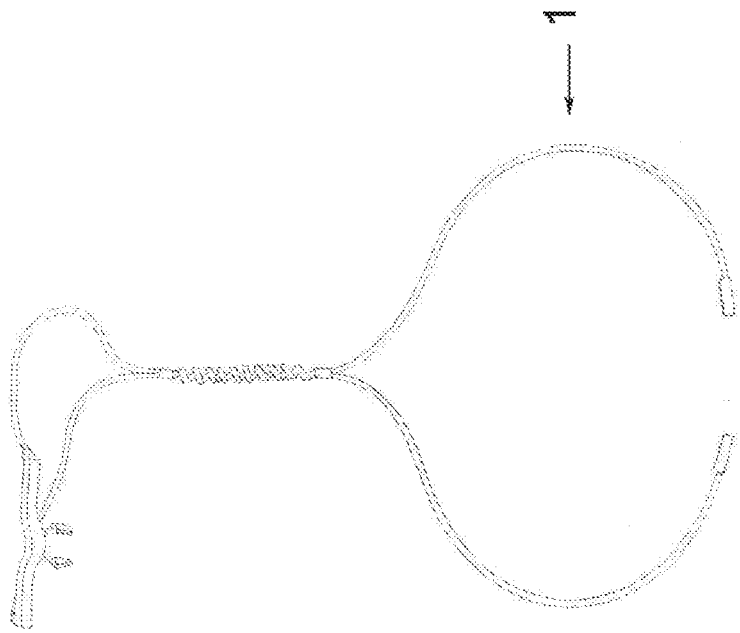
FIG. 21 shows an embodiment of a neck-loop made open, according to the invention.

In various embodiments (see FIG. 21) the neck loop may be open.

Figure 22:
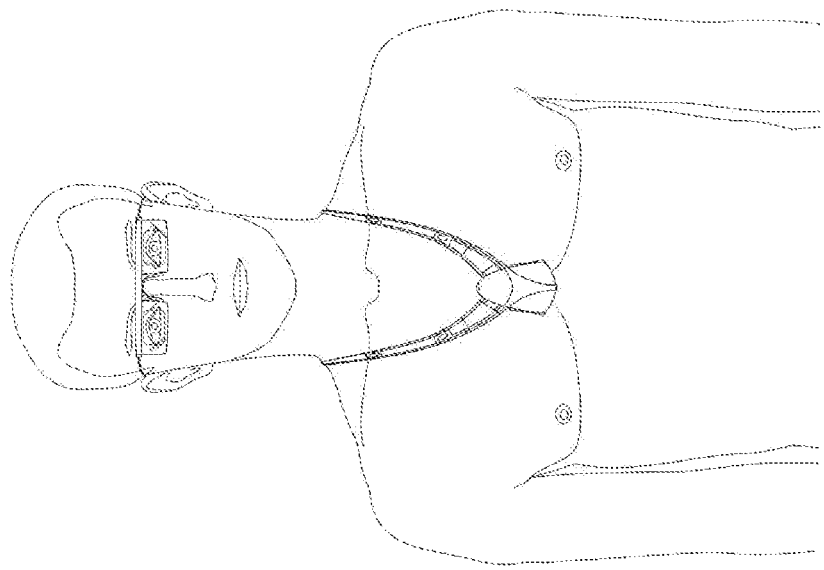
FIGS. 22, 23, 24, 25, 26 show various embodiments of a wearable device worn on the user, according to the invention.
Figure 24:
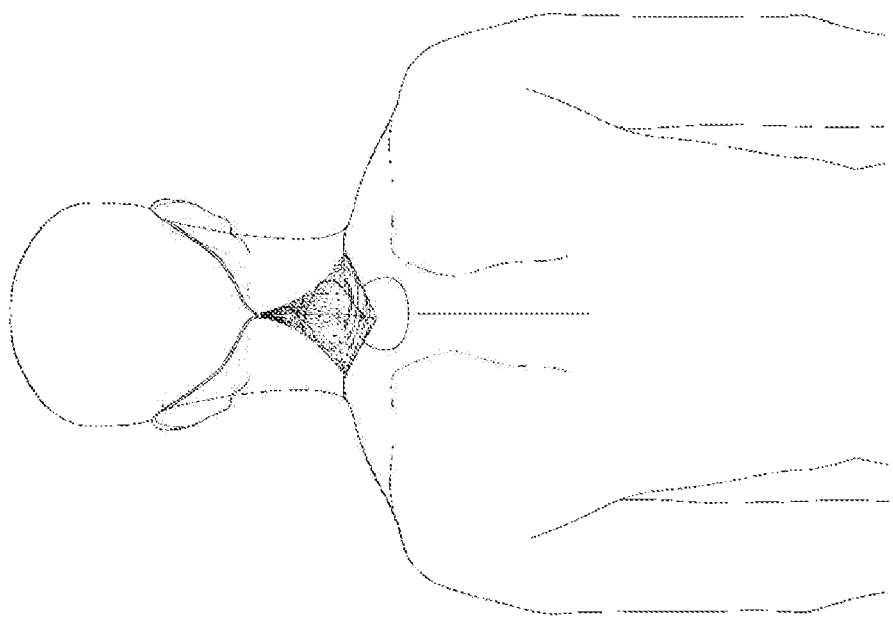
Figure 23:
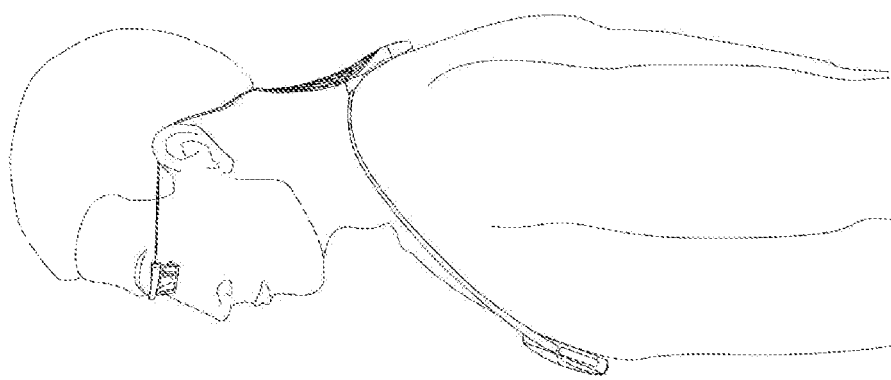
Figure 26:
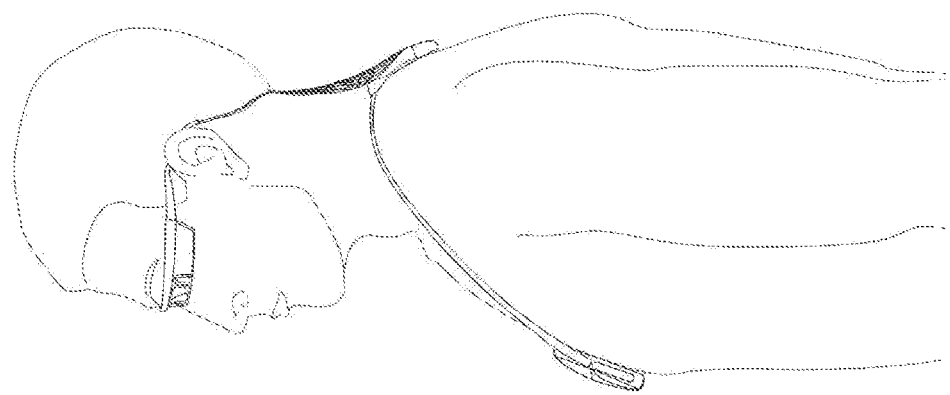
Figure 25:
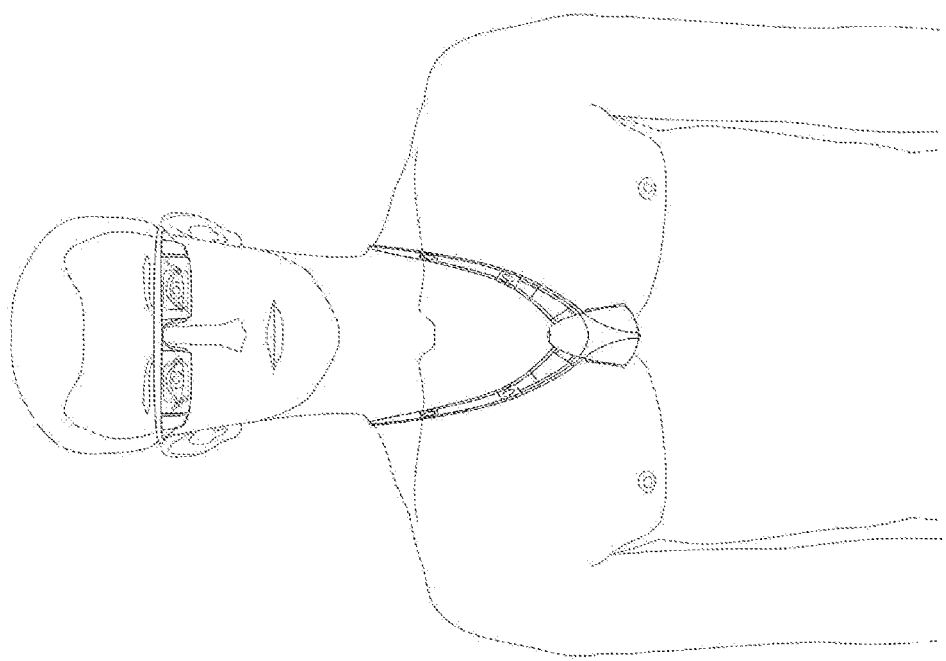

FIGS. 22, 23, 24 show an embodiment of a wearable device worn on the user in operating state. This embodiment is made without lateral temples. FIGS. 25, 26 show an embodiment of a wearable device worn on the user in operating state, with a spectacle frame comprising temples.

Figure 27:
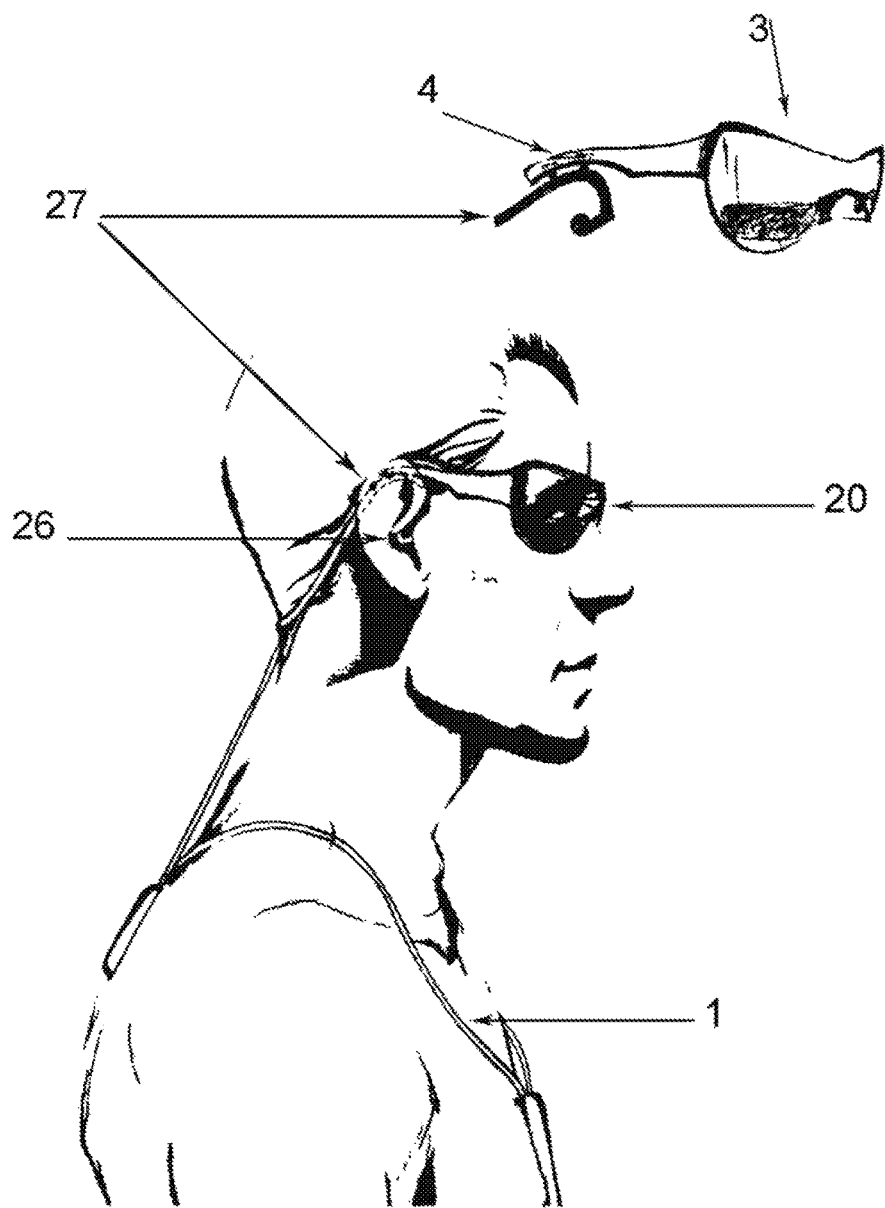
FIG. 27 shows an embodiment of a wearable device comprising earphones and contact sets placed on lateral temples and earphones, according to the invention.
Figure 28:
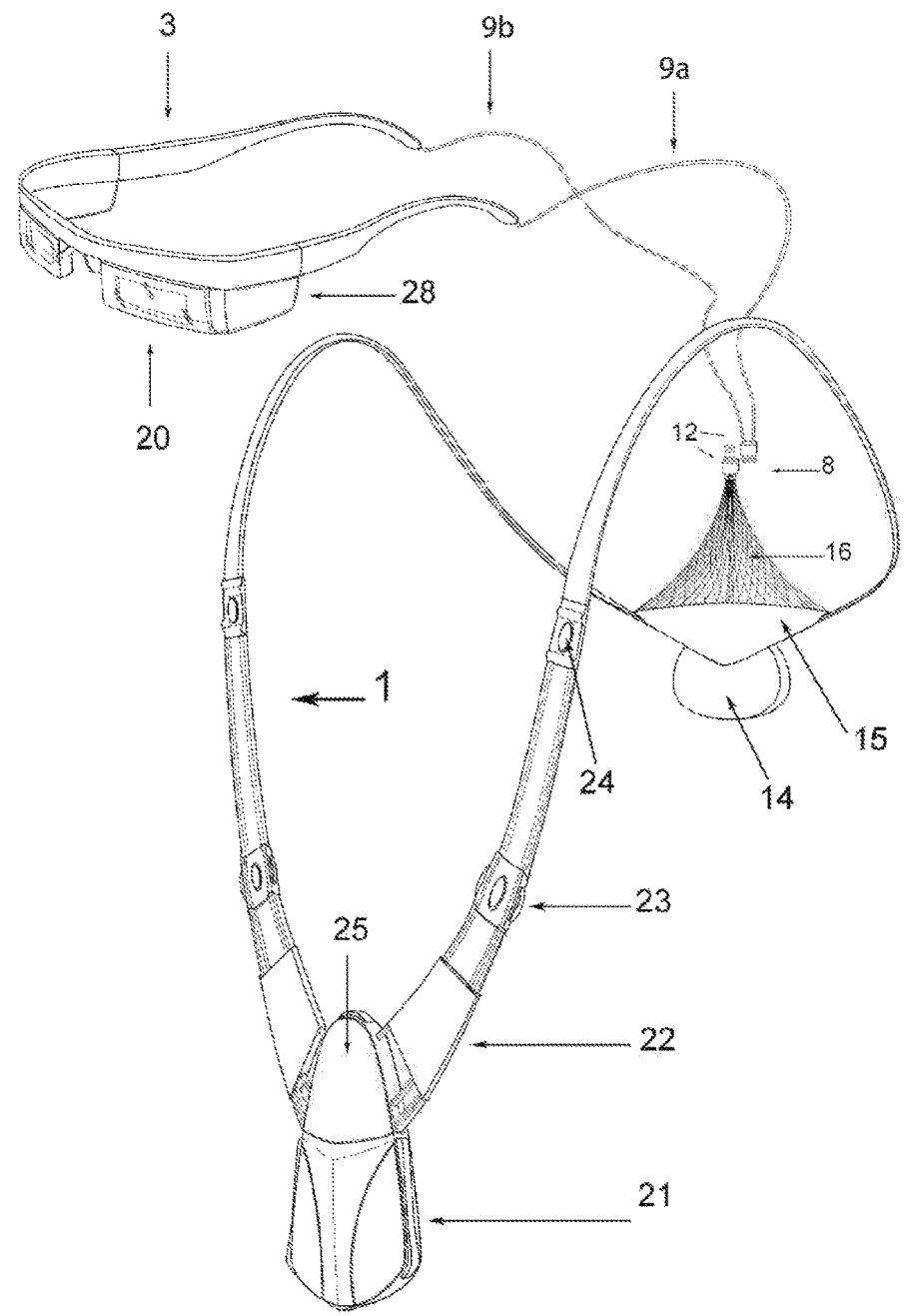
FIG. 28 shows a preferred embodiment of a wearable device with the multifunctional options, according to the invention.

In some embodiments (see FIG. 27) the device includes earphones 26, comprising temples with contact set 27 for electrically connecting the neck-loop 1 and the spectacle frame 3 comprising display 20. FIG. 28 shows the multifunction wearable device. Displays 20 for displaying visual information and display electronic control unit 28 are mounted on spectacle frame 3. Adapter 8 connects the frame 3 and neck-loop 1 and the adaptor contains connector 12 in the dorsal wire node, a wire winding mechanism 14 and a storage pocket 15 for storing the wires are disposed in the area of the suboccipital wire node, a storage pocket 15 further equipped with a spring net 16. Neck loop comprises an electronic unit 21, a few batteries 22 to meet the requirements of energy-intensive display and interface elements 22, 23, 25 configured to enable the user to control the wearable device by touch under clothing.

Figure 29:
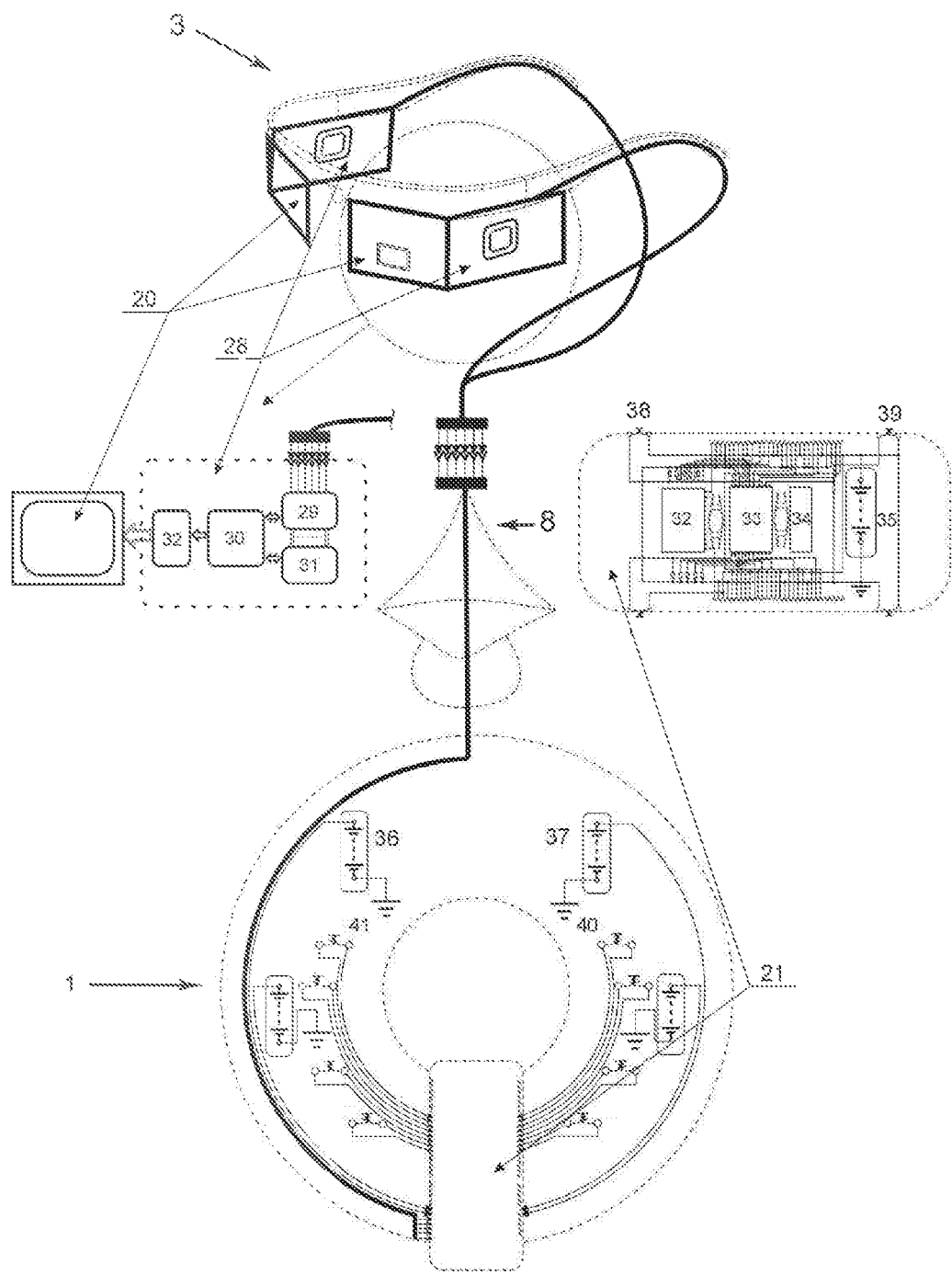
FIG. 29 shows an exemplary circuitry of a wearable device, according to the invention.

A schematic circuit diagram of the wearable device is shown in FIG. 29. Display electronic control unit 28 and a translucent display 20 are mounted on the eyeglass frame 3. The electronic control unit 28 may comprise a serial port 29 for commands and data transmission, a signal processor 30, a memory 31; display controller 32. The electronic control unit may further comprise a video camera matrix and its controller. Spectacle frame 3 via an adapter 8 comprising wires 9a, 9b is connected to the neck-loop 1, which is placed an electronic unit 21 comprising a serial port for the monitor 32, processor 33, memory 34, an accumulator 35, a set of control buttons, such as 38, 39. It is possible additionally to place on neck loop high capacity batteries, for example 36, 37, and interface buttons 40, 41.

Figure 30:
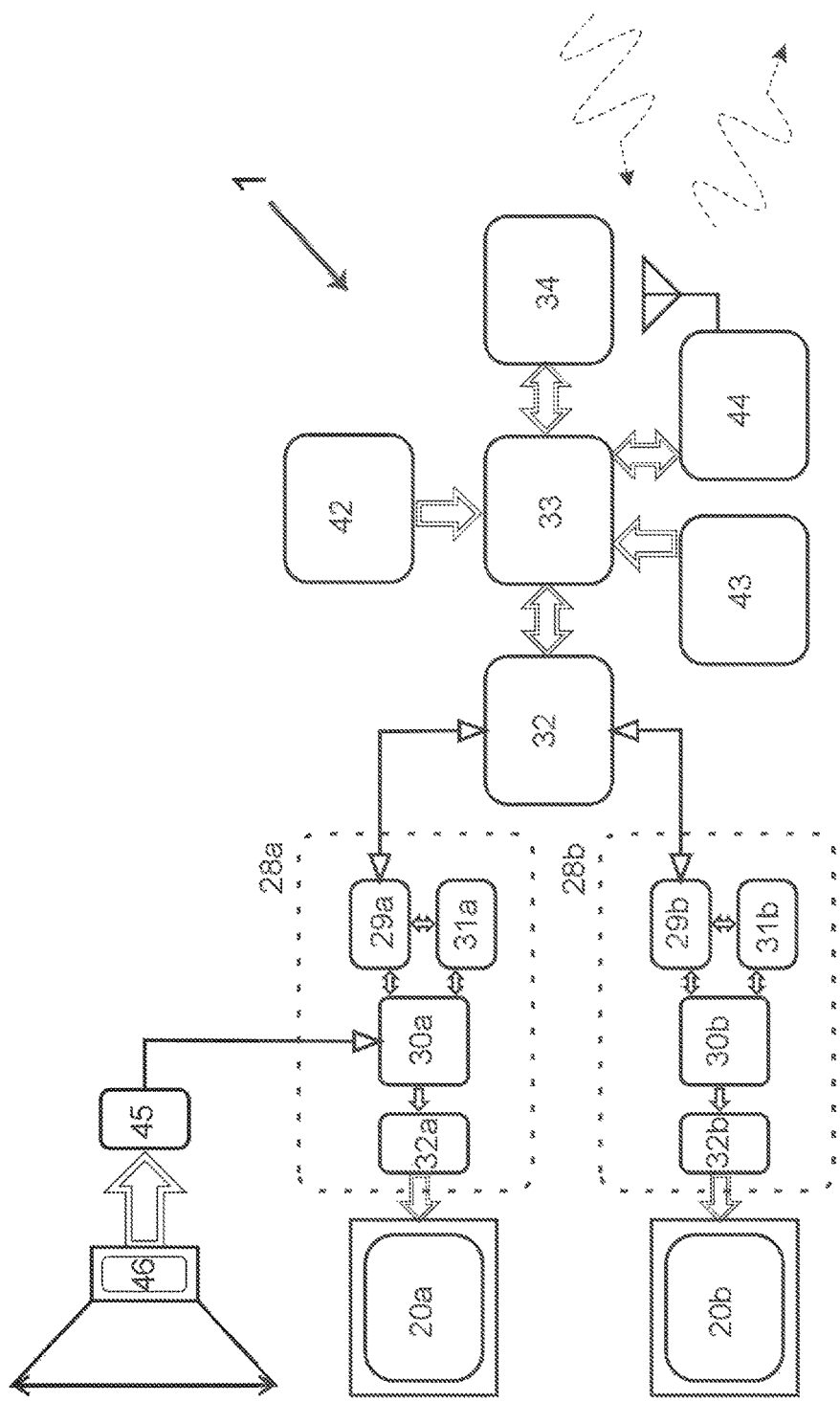
FIG. 30 shows a schematic diagram of a wearable device, according to the invention.

A schematic diagram of the wearable device in a dual display embodiment is shown in FIG. 30. This embodiment provides two independent channels for data processing, a separate one for each display. The head-mounted part of the wearable device (a spectacle frame) comprises two semi-transparent display or two miniature laser projector 20a and 20b simulating displays. The displays are controlled with electronic units 28a, 28b, 32a comprising monitor controllers, forming strings sweep and transmitting a signal to the display cells. Signal is transmitted to the controllers via serial ports 29a, 29b. Signal processors 30a and 30b are used for the conversion and processing of data, whose work is supported by the memory chips 31a and 31b. A camera also can be placed on the spectacle frame. The image is projected on a matrix of photodetectors 46. Then the signal is processed by the controller 45 and supplied to the processor 30a.

The diagram also shows the elements of a wearable device mounted on the neck-loop 1 and on the electronic unit. The neck loop electronic unit comprises a processor 33. The user can control a wearable device, including elements placed on either frame, via the buttons and keys 42. Data and control commands exchange between the head-mounted part and the underwear part of the device via the serial port 32. User's data and wearable device software are stored in the memory unit 34. A power supply of all elements of the scheme is provided with batteries placed on the neck-loop, control and management of power and battery charge are operated by the controller 43. A communication unit is connected with external information space via radio frequency communication element 44.

A composite wearable electronic communication device has some ergonomic advantages due to the user interface in which the buttons and keys for managing the whole device placed on the neck-loop are disposed on the user's body in the region of an isosceles triangle with a horizontal base, lying between the proximal ends of the clavicles, and a vertex directed downward in the region of xiphoid appendix, and slightly higher for women, so that the reach area of the body field of hand movements takes into account the user's clothes not only in a warm, but also in a cold climate, for example, a man in the standard European clothes is shown. This allows the user to manage the wearable device by pressing buttons and keys that are easy to find on the touch over the conventional clothes because they are relatively non-displaceable, projected at about the same place relative to the user's body; the keys are tactilely distinguishable from one another and may provide a feedback in the form of tactile or audible (click) response when pressed. In some embodiments, the device has a vibration mechanism for the incoming call.

Direct contact between the under-clothing part of the device and the user's skin allows positioning on it sensors for monitoring the state of user's health, such as temperature, blood pressure, sugar, alcohol in skin secretions, etc., to monitor galvanic skin response for control of the sympathetic nervous system, which allows using the device as a part of a biotelemetry complex for medical diagnostics.

In many embodiments, graphical interface on the screen placed in front of the user's eyes can be managed without taking the electronic block from under the clothes or a phone from the pocket, because the buttons located under clothes can be pressed from outside, over clothes, or by giving voice commands without hand manipulations at all. However, it should be borne in mind that to activate voice commands a button on the neck loop still needs to be pressed, which increases the value of the used tactile interface.

With a constantly worn, but nearly invisible, electronic device, the user can receive visual information, be in touch, listen to music, podcasts, and receive current voice and visual information without impairing the user's appearance and differentiating oneself from others.

The electronic device allows combining an electronic device with bijouterie.

The wearable electronic device can be used as AR-glasses, as an option to a mobile phone, as a component of a wearable mobile complex, comprising a screen and interface on the wrist, head-mounted display connecting with the neck loop comprising the electronic components. The hardware may be dispersed in to several devices carried by a person, for example, some of hardware and battery base can be accommodated in a man's trouser belt, while the wired connection to the neck loop can be implemented in a cord, which lies under the clothes along the user's spine on the back or along the user's stomach; the wearable electronic device itself can be a mobile phone (smartphone), while a separately worn keyboard unit can be a wireless interface to it.

With further development of technologies that enhance capabilities of voice communications between human and computer, as well as with widespread of 3G and 4G communication the advantages of the wearable electronic device become even more obvious, in particular: improved quality of communications with the ability to speak, see and listen to a counterpart, transmitting him the visual information around the user (if the camera is on spectacle frame), the use of GPS navigation with map projection in front of the user's eyes. When a user performs any actions, functions or operations which involve both hands, if the device is available, it is possible to be constantly in touch or connected to a network without focusing on keeping the phone, but using voice and visual prompts of the operator or computer.

The headset can be a part of an integral complex, which includes, along with display glasses and other body-worn mobile devices, home or office computers implementing permanent communications between themselves and the operator base; such a complex can be called "cloud mobiling" by analogy with "cloud computing".

Having thus described a preferred embodiment, it should be apparent to those skilled in the art that certain advantages of the described method and apparatus have been achieved.

It should also be appreciated that various modifications, adaptations, and alternative embodiments thereof may be made within the scope and spirit of the present invention. The invention is further defined by the following claims.

TABLE 1

Comparison of mobility and maximum length of cord in wearable devices with various geometry

| | | Movement | | | | |
|---|---|---|---|---|---|---|
| | | Rotation of head in horizontal plane | | Tilt of head forward/backward | | Tilt of head sideway |
| Device type | | Estimate at Formula parameters: | | Estimate at Formula parameters: | | Estimate at Formula parameters |
| Device with two nodes | (6) | $R = 6.5$ cm, $h = 6$ cm, $D = 1$ cm, $\alpha = 90° ==$ 1.6 rad, $\Delta St = 2.9$ cm | (12) | $R = 6.5$ cm, $h_0 = 2$ cm, $D = 1$ cm $\Delta Sc = 8.6$ cm | (24) | $R = 6.5$ cm, $h = 6$ cm, $h_0 = 2$ cm, $\alpha_m = 45° ==$ 0.8 rad, $\Delta Ss = 0.6$ cm |
| Device with single node | (7) | $R = 6.5$ cm, $H = 13$ cm $\Delta St1 = 12.5$ cm | (18) | Lmax = 9.8 cm (see expression (14)) $r_0 = 3$ cm, $\gamma_0 = 45°$ $\Delta Sc1 = 2.2$ cm | (34) | $R = 6.5$ cm, $h = 6$ cm, $h_0 = 2$ cm, $\alpha_m = 45° = 0.8$ rad, $\Delta Ss1 = 3.4$ cm |
| Device with two side nodes | (8) | $R = 7$ cm, $H = 13$ cm $\Delta St2 = 5.2$ cm | (19) | $L_{max\ 1} = \sqrt{H^2 + R^2\pi^2} = 25.5$ cm $r_0 = 3$ cm, $\gamma_0 = 45°$ $\Delta Sc2 = 3$ cm $L_{max\ 2} = H + R_s\alpha_m = 19.4$ cm | | $R = 6.5$ cm, $h = 6$ cm, $h_0 = 2$ cm $\alpha_m = 45° ==$ 0.8 rad, $\Delta Ss2 = 11$ cm |

What is claimed is:

1. A wearable electronic communication device comprising:
    a neck loop with a first electrical connector;
    a frame comprising
    (i) a second electrical connector,
    (ii) a front bar with nose pads, and
    (iii) two temples, wherein each temple is connected to one of two lateral ends of the front bar;
    first and second wires connected to respective lateral temples;
    wherein the first wire is electrically connected to the second electrical connector, and the other end of the first wire is electrically connected to the first electrical connector,
    wherein the first and second wires are connected to the neck loop to form a dorsal wire node on a neck of a user when worn by the user, and
    wherein the first and second wires are mechanically connected to each other between the frame and the dorsal wire node to form a suboccipital node on a back of the user's head.

2. The wearable device of claim 1, wherein, when worn by the user, the first and second wires are tensioned along a surface of the user's head.

3. The wearable device of claim 1, wherein, when worn by the user, the dorsal wire node is near a seventh cervical vertebra, and the suboccipital node is near an exterior occipital tuber.

4. The wearable device of claim 1, wherein the suboccipital node is a clip relocatable along the first and second wires to adjust a length of the first and second wires.

5. The wearable device of claim 1, wherein the dorsal node comprises an electrical connector for disconnecting the neck loop from the spectacle frame.

6. The wearable device of claim 1, wherein the suboccipital node comprises an electrical connector for disconnecting the neck loop from the spectacle frame.

7. The wearable device of claim 1, wherein at least one of the first and second wires is a spring in a wire portion between the suboccipital node and the dorsal wire node.

8. The wearable device of claim 1, further comprising a spring disposed between the suboccipital node and the dorsal node.

9. The wearable device of claim 1, wherein the neck loop is open.

10. The wearable device of claim 1, wherein the frame comprises at least one visual information displaying device.

11. The wearable device of claim 1, further comprising at least one power supply unit on the neck loop.

12. The wearable device of claim 1, further comprising buttons and/or keys on the neck loop.

13. A composite wearable electronic communication device comprising:
  a neck loop with a first electrical connector;
  a spectacle frame with a second electrical connector, the spectacle frame comprising a front bar having a nose support for abutting a bridge of a nose of a user when the spectacle frame is worn, and two lateral temples, wherein one end of each lateral temple is connected to one of two lateral ends of the front bar, disposed opposite each other;
  a flexible adapter comprising first and second wires connected to the respective lateral temples, wherein the first wire is electrically connected to the second electrical connector and to the first electrical connector;
  wherein the two wires are connected to the neck loop to form a dorsal node on a neck of a user when worn by the user;
  wherein the two wires are mechanically connected to each other between the spectacle frame and the dorsal node to form a suboccipital node below an occiput of the user.

14. The wearable device of claim 13, wherein a length of a wire portion between the suboccipital node and the dorsal node is 5 cm to 10 cm.

15. The wearable device of claim 13, wherein the suboccipital node is a clip configured to be relocated along the first and second wires in order to adjust a length of the first and second wires.

16. The wearable device of claim 13, wherein the dorsal node comprises a third electrical connector for disconnecting the neck loop from the spectacle frame.

17. The wearable device of claim 13, wherein the suboccipital node comprises a third electrical connector for disconnecting the neck loop from the spectacle frame.

18. The wearable device of claim 13, wherein the neck loop is open.

19. The wearable device of claim 13, wherein the spectacle frame comprises two visual information displaying devices.

20. The wearable device of claim 13, further comprising at least one power supply unit disposed on the neck loop.

21. A composite wearable electronic communication device comprising:
  a neck loop with a first electrical connector;
  a spectacle frame with a second electrical connector, the spectacle frame comprising a front bar having a nose support, and two lateral temples, wherein one end of each lateral temple is connected to one of two lateral ends of the front bar;
  a flexible adapter comprising first and second wires connected to the respective lateral temples, wherein the first wire is electrically connected to the second electrical connector and to the first electrical connector;
  wherein the two wires are connected to the neck loop to form a dorsal node on a neck of a user when worn by the user; and
  a visual display device hingedly mounted on the spectacle frame and movable relative to the spectacle frame.

* * * * *